United States Patent [19]
Chow et al.

[11] Patent Number: 5,684,636
[45] Date of Patent: Nov. 4, 1997

[54] POLYMER-OPTICAL LIQUID MATRIX FOR USE AS A LENS ELEMENT

[75] Inventors: Andrea W. Chow, Los Altos; Hope B. Warren, Cupertino; Susan P. Ermer, Redwood City, all of Calif.

[73] Assignee: Lockheed Martin Corporation, Bethesda, Md.

[21] Appl. No.: 518,651

[22] Filed: Aug. 24, 1995

[51] Int. Cl.⁶ .................................................. G02B 3/12
[52] U.S. Cl. .................................................. 359/665
[58] Field of Search ........................... 359/665; 524/287, 524/104

[56] References Cited

U.S. PATENT DOCUMENTS

| | | |
|---|---|---|
| 3,929,667 | 12/1975 | Bautis . |
| 4,465,621 | 8/1984 | Sacher . |
| 4,526,711 | 7/1985 | Sacher et al. . |
| 4,958,919 | 9/1990 | Sigler . |
| 5,020,889 | 6/1991 | Mercado et al. . |
| 5,033,831 | 7/1991 | Sigler . |
| 5,345,337 | 9/1994 | Sigler ............................ 359/665 |

OTHER PUBLICATIONS

A.W. Chow, et al., "Correlation of chemical structure and refractive index dispersion of abnormal optical liquids," SPIE vol. 2018 Passive Materials for Optical Elements II, 206–215 (1993).

R.D. Sigler, "A new abnormal dispersion liquid for use in the design of high performance optical systems," SPIE vol. 2018 Passive Materials for Optical Elements II, 188–199 (1993).

R.D. Sigler, "Glass selection for airspaced apochromats using the Buchdahl dispersion equation," Applied Optics vol. 25, No. 23, 4311–4320 (Dec. 1, 1986).

R.D. Sigler, "Designing apochromatic telescope objectives with liquid lenses," SPIE vol. 1535 Passive Materials for Optical Elements, 89–111 (1991).

R.D. Sigler, "Apochromatic color correction using liquid lenses," Applied Optics vol. 29, No. 16, 2451–2459 (Jun. 1, 1990).

M.V. Petrova, et al., "Abnormal dispersion liquids," Optical Engineering vol. 31, No. 4, 664–667 (Apr. 1992).

Primary Examiner—Georgia Y. Epps
Assistant Examiner—John P. Cornely
Attorney, Agent, or Firm—Susan T. Evans; Peter J. Dehlinger

[57] ABSTRACT

A polymer composition is provided for use as a liquid lens element in a compound lens designed to reduce chromatic aberration. The polymer composition (i) has an abnormal optical dispersion and (ii) is more easily fabricated into the compound lens than a conventional optical liquid. The composition contains an abnormal optical liquid characterized by an abnormal optical dispersion and a polymer component. The polymer is soluble in the optical liquid and is present in an amount effective to impart a viscosity that is at least an order of magnitude greater than that of the liquid alone at a selected temperature.

25 Claims, 11 Drawing Sheets

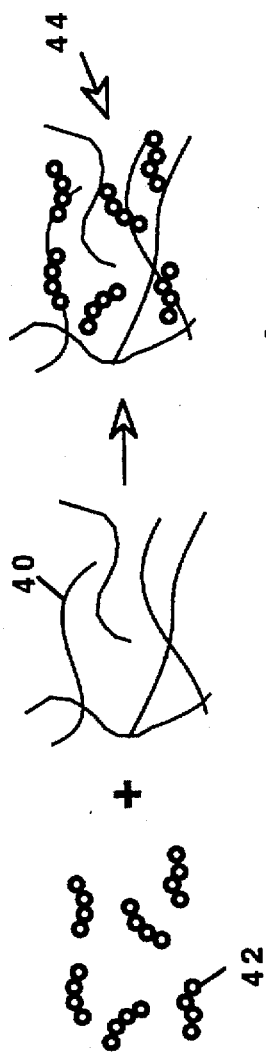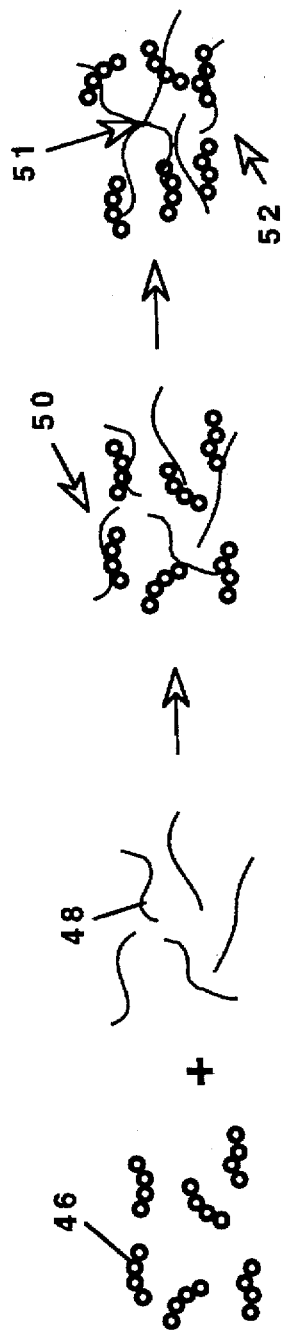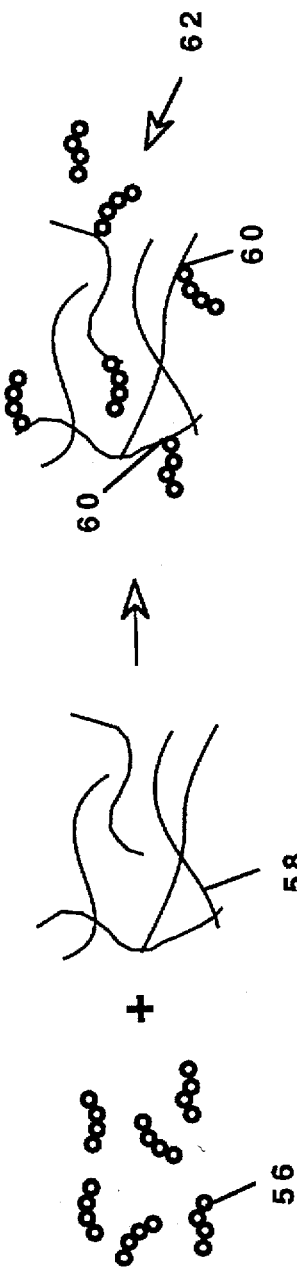

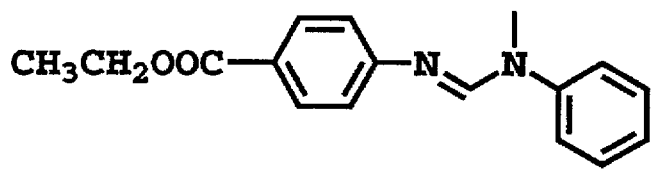
Fig. 5C
Fig. 5D

Fig. 5F
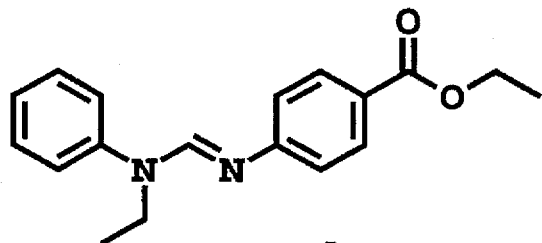
Fig. 5G

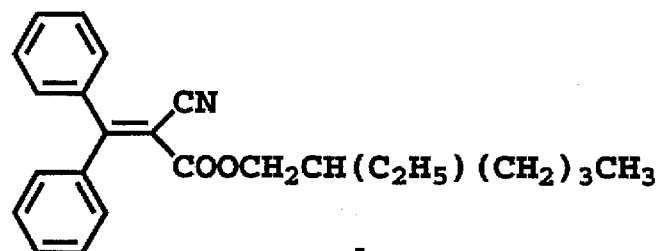
Fig. 5N
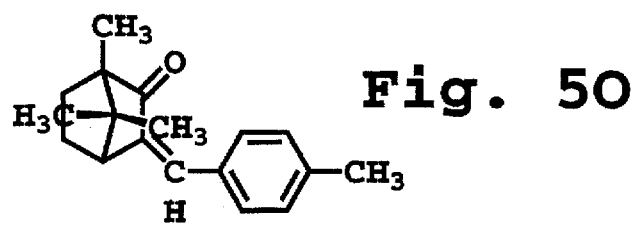
Fig. 5O
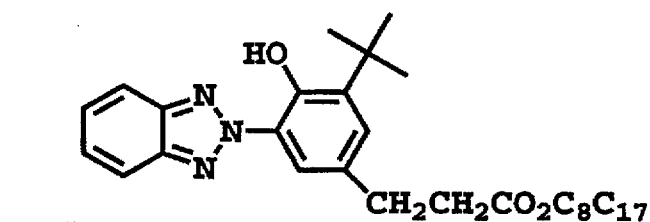
Fig. 5P
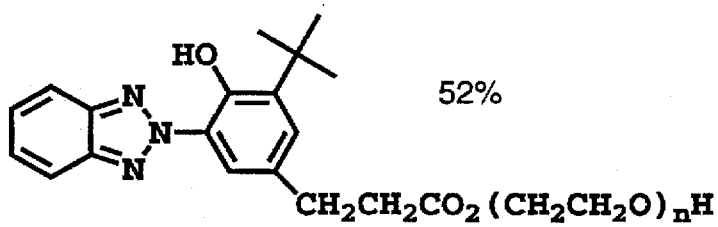
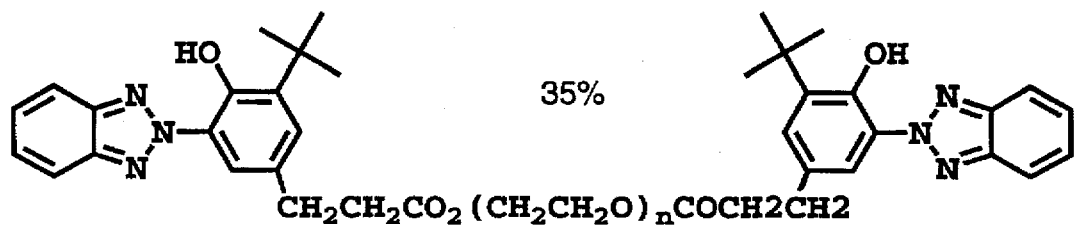
Fig. 5Q

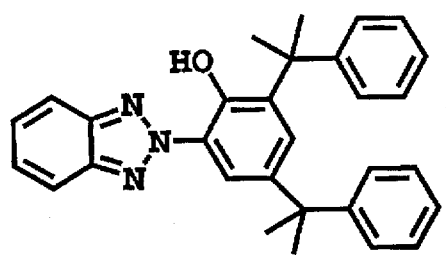
Fig. 5R

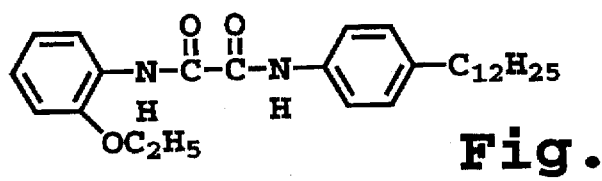
Fig. 5T
Fig. 5U
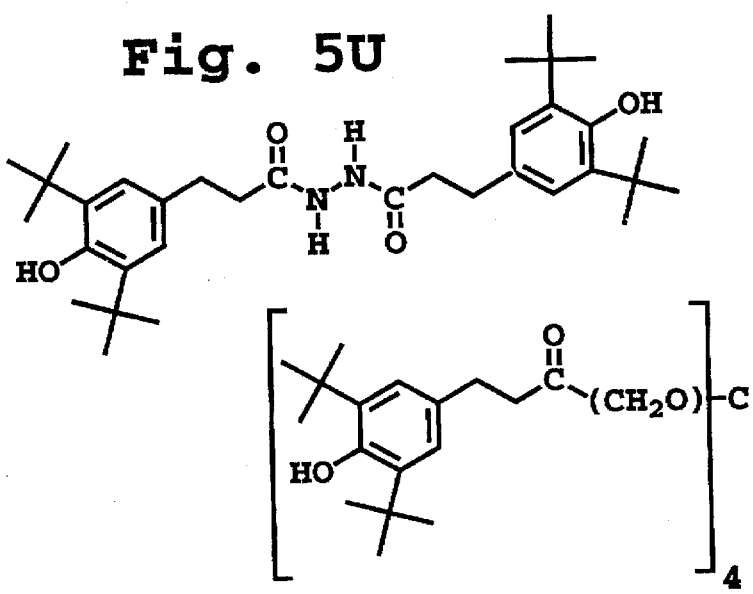
Fig. 5V
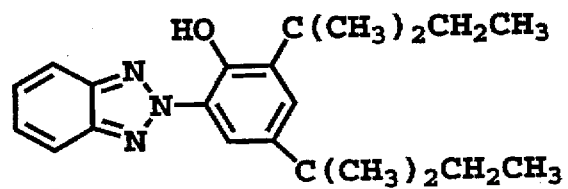
Fig. 5W

POLYMER-OPTICAL LIQUID MATRIX FOR USE AS A LENS ELEMENT

FIELD OF THE INVENTION

The present invention relates generally to color-corrected optical lenses and in particular to a polymer composition having an abnormal dispersion for use in a compound lens.

REFERENCES

Brandup, J. and Immergut, E. H., *POLYMER HANDBOOK.*, 3rd Edition, John Wiley and Sons, (1989).
Billmeyer Jr., F., *TEXTBOOK OF POLYMER SCIENCE*, 2nd Edition, John Wiley and Sons (1971).
Hemmings, R. L., et al., *Polymer* 27:1819–1822 (1986).
Herzberger, M., et. al., *J. Opt. Soc. Am.* 39:984 (1949).
Herzberger, M., *Opt. Acta.* 6:197 (1959).
Herzberger, M., et. al., *Appl. Opt.* 2:553 (1963).
Lessing, N. v. d. W., *J. Opt. Soc. Am.* 47:955 (1957).
Lessing, N. v. d. W., *J. Opt. Soc. Am.* 48:269 (1958).
Lessing, N. v. d. W., *J. Opt. Soc. Am.* 48:558 (1959a).
Lessing, N. v. d. W., *J. Opt. Soc. Am.* 49:31 (1959b).
Marvel, C. S., et al., *J. Amer. Chem. Soc.* 75:3272–3273 (1953).
Petrova, M. V., et al., *Optical Engineering* 31(4):664–667 (1992).
Robb, P. N., et al., *Applied Optics* 22:4311:4320 (1990).
Sigler, R. D., *Applied Optics* 25:4311–4320 (1986).
Sigler, R. D., *Applied Optics* 29(16):2451–2459 (1990a).
Sigler, R. D., U.S. Pat. No. 4,958,919, (1990b).
Sigler, R. D., *SPIE, Passive Materials for Optical Elements* 1535:89–111 (1991a).
Sigler, R. D., U.S. Pat. No. 5,033,831, (1991b).
Sigler, R. D., *SPIE, Passive Materials for Optical Elements II* 2018:188–199 (1993).
Stephens, R. E., *J. Opt. Soc. Am.* 47:1135 (1957).
Stephens, R. E., *J. Opt. Soc. Am.* 49:398 (1959).
Stephens, R. E., *J. Opt. Soc. Am.* 50:1016 (1960).
Van Krevelen, D. W., *PROPERTIES OF POLYMERS*, 3rd Edition, Elsevier Science Publishing Co., Inc., New York, N.Y. (1990).

BACKGROUND OF THE INVENTION

The conventional approach to designing lens systems for control of chromatic aberrations has been to use glasses having different refractive index dispersion characteristics within the lens system. The glasses are used in combination to form lens systems that are color-corrected at two or more wavelengths.

A lens system having zero axial chromatic aberration at two wavelengths is said to be color-corrected at those two wavelengths and is described as an achromatic system. A lens system color corrected at three wavelengths is referred to as an apochromatic system.

Reducing the residual chromatic aberration, that is, the secondary spectrum, is normally accomplished by using a glass or crystal having an abnormal dispersion (Sigler, 1991a; Petrova, et al., 1992). The higher the degree of abnormal dispersion properties the glass or crystal has, the more effectively the secondary spectrum can be eliminated. However, abnormal glass and crystal materials used for color correction are difficult to fabricate, frequently subject to atmospheric attack and can be extremely expensive (Sigler, 1990a).

Liquids have recently been considered as alternatives to glass or crystal materials having an abnormal dispersion (Sigler, 1990a; Sigler, 1990b; Sigler 1991a; Sigler, 1991b; Petrova, et al., 1992). Some liquids have very unusual dispersion properties and, when used in combination with normal-dispersion glasses, present the potential for low-cost color-corrected lens systems.

However, there are a number of difficulties associated with using a liquid in a lens system, primarily in the fabrication and assembly of such a lens system.

One of the main obstacles is that sealing the liquid(s) within the lens assembly complicates the mechanical design of the system. As most liquids are quite penetrating, care has to be taken to ensure that all bonds are thoroughly cured, or debonding and leakage of the liquid from the lens system can occur.

An additional problem with the use of liquids in lens systems is the sensitivity of liquids to changes in temperature. First, the mechanical design of the system should accommodate volumetric changes that result from temperature changes. Second, liquids have large changes in refractive index as a function of temperature. Thus, lens systems which include a liquid experience a change in focal length when subjected to temperature changes. This can be a problem in applications where refocusing is not easily possible. Further, in low viscosity liquids, temperature changes tend to cause straie formation which can obscure optical imaging for a period of time until thermal equilibration is achieved.

Another thermal consideration with glass-liquid apochromats is the possibility of the liquid freezing in extremely severe environments. When the liquid freezes it becomes opaque and imaging is no longer possible.

SUMMARY OF THE INVENTION

Accordingly, it is an object of the invention to provide a composition for use in a compound lens that (i) has an abnormal optical dispersion and (ii) is more easily fabricated into the compound lens than a conventional optical liquid.

The present invention provides a polymer composition for use as a liquid lens element in a compound lens designed to reduce chromatic aberration. The composition contains an abnormal optical liquid characterized by an abnormal optical dispersion value of at least ±0.01 dispersion units, defined as the difference between the value of $\eta 2$ measured for the abnormal optical liquid and the value of $\eta 2$ determined from a normal Buchdahl dispersion line for glasses at the same $\eta_1$ value as that of the abnormal optical liquid.

The composition further includes a polymer component. The polymer is soluble in the optical liquid and is present in an amount effective to impart a viscosity that is at least an order of magnitude greater than that of the liquid alone at a selected temperature, while not reducing the optical dispersion value of the composition below ±0.01 dispersion units from the normal Buchdahl dispersion line for glasses for the $\eta 2$ value of the composition. In a preferred embodiment, the polymer is present in an amount effective to impart a viscosity that is 5–6 orders of magnitude greater than that of the optical liquid alone.

Abnormal optical liquids for use in the present invention include organic liquids, particularly those with high aromaticity or having a high degree of conjugation. Such organic liquids for use in the invention include cinnamic acid derivatives such as ethyl cinnamate, amyl-trans-cinnamaldehyde, trans-cinnamaldehyde, methyl-trans-cinnamaldehyde, and N,N-dimethylamino(trans-cinnamaldehyde).

In an alternate embodiment, the abnormal optical liquid is an organic liquid exhibiting strong ultraviolet absorption, such as 4-(methylphenylamino)methylene(amino)-benzoic acid, ethyl ester; 3-(2H-benzotriazol-2-yl)-5-(1,1-dimethylethyl)-4-hydroxy-benzenepropanoic acid, C7-9-branched esters; 2-(2'-hydroxy-3'-5'-di-tert-amylphenyl) benzotriazole; para-methoxycinnamic acid, isoamyl ester; 5-methyl-2-(1-methylethyl)cyclohexanyl-2-aminobenzoate; and 2-cyano-3,3-diphenyl-2-propenoic acid, 2-ethylhexyl ester.

Also for use in the present invention are abnormal optical liquids having a silicon backbone such as siloxane.

In one embodiment, the polymer composition of the invention contains more than one abnormal optical liquid. In an alternate embodiment, the polymer composition contains one or more optical liquids, composed of one or more abnormal organic solids, such as 4-(ethyl phenylamino) methylene-amino-benzoic acid, ethyl ester; trans-1-(4-pyridinyl)-2-(2-thiophenyl)ethene; (2-hydroxy-4-methoxyphenyl)phenyl-methanone; (2,4-dihydroxyphenyl)-phenyl-methanone; 2-(2'-hydroxy-3', 5'-di-tert-amylphenyl) benzotriazole; and 3-(4-methylbenzylidene)-d-1-camphor, dissolved in a suitable organic solvent, such as N-methylpyrrolidone. In one embodiment, the solvent may also be abnormal.

In general, the optical liquid has a solubility parameter between about 8 and 14 (cal cm$^{-3}$)$^{1/2}$.

The polymer is typically present in the composition in an amount between 2–40 weight percent and has a molecular weight between 10–1000 kDaltons. In one embodiment, the polymer is crosslinked following dissolution of the polymer in the optical liquid. In an alternate embodiment, the polymer includes covalently attached molecules of the optical liquid.

In general, the polymer has a solubility parameter between about 8 and 14 (cal cm$^{-3}$)$^{1/2}$ and is characterized by having a normal optical dispersion.

Polymers for use in the invention include aliphatic and aromatic hydrocarbons such as polyethylene and polystyrene. Alternately, the polymer component is a polymer having main chain cyclic units such as poly (acenaphthalene). Additional polymers for use in the invention include heteroatom-containing polymers such as polymethylmethacrylate, polycarbonate, polyoxyethylene, polyurethane, polyvinylcinnamate, polyvinyl alcohol, and polyacrylamide; polymers containing silicon such as polydimethylsiloxane; and halogenated polymers such as polytetrafluoroethylene. Alternately, the polymer may be a cellulosic polymer such as hydroxypropyl cellulose. In one embodiment, the polymer is a co-polymer such as poly (butadiene-co-acrylonitrile).

In one embodiment, the polymer is present in an amount effective to depress the freezing point of the composition at least about 5° C. below that of the optical liquid alone.

In another aspect, the invention provides a compound lens characterized by low chromatic aberration. The compound lens is composed of a rigid converging lens, a rigid diverging lens, and interposed between the two lenses is a sealed space carrying a polymer composition containing an abnormal optical liquid as described above.

These and other objects and features of the invention will be more fully appreciated when the following detailed description of the invention is read in conjunction with the accompanying drawings.

BRIEF DESCRIPTION OF THE FIGURES

FIGS. 4A–4C illustrate methods of combining a polymer with an optical liquid for use as a liquid lens element;

DETAILED DESCRIPTION OF THE INVENTION

I. Definitions

Figure 1A:
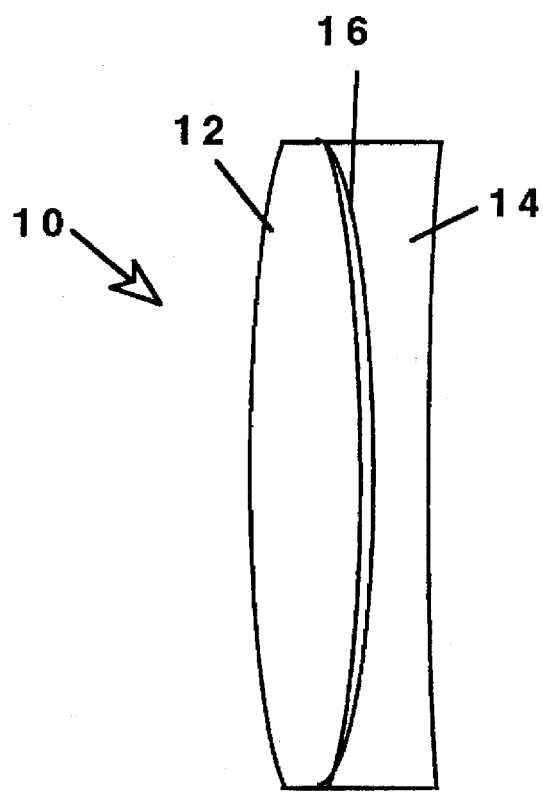
FIGS. 1A–1B illustrate compound lens systems containing a liquid lens element composed of the polymer composition of the present invention in combination with either two (FIG. 1A) or three (FIG. 1B) rigid lens elements.

As used herein, "abnormal optical dispersion value" for a given medium is defined as the absolute value of the difference between the $\eta_2$ value for a given medium, determined from the Buchdahl dispersion equation (Sigler, 1986), and the corresponding $\eta 2$ value for a point ($\eta_{2normal}$, $\eta_{1normal}$) lying on the normal line for glasses, determined from the Buchdahl dispersion equation, at the same $\eta_1$ value as that of the medium, of at least 0.01 units.

According to the above, for a given medium characterized by values of $\eta_2$ and $\eta_1$ as determined from the Buchdahl dispersion model, $$(\eta_{2med}, \eta_{1med}),$$

and a point lying on the normal line for glasses as described above, characterized by values of $\eta_2$ and $\eta_1$ $$(\eta_{2normal}, \eta_{1\ normal}),$$

where $$\eta_{1med} = \eta_{1normal},$$

the following must hold true for a medium to be characterized as having an abnormal optical dispersion value:

$$/\eta_{2med} - \eta_{2normal}/ \geq 0.01,$$

where $$/\eta_{2med} - \eta_{2normal}/\Delta\eta_2$$

"Abnormal optical liquid" as used herein describes a liquid having an abnormal optical dispersion, as defined above. For a given material, the greater the value of $\Delta\eta_2$, the greater the degree of abnormal dispersion.

"Chromatic aberration" refers to a property in an optical system that causes the system to focus the various colors in a beam of light at various points to produce a secondary spectrum.

"Normal line for glasses" as used herein refers to a straight line obtained by plotting the primary and secondary dispersion coefficients, $\eta_1$ and $\eta_2$, (representing the first two terms in the power series expression for refractive index derived from Buchdahl's dispersion equation) for each of 236 different Schott optical glasses as coordinates on an orthogonal Cartesian coordinate system and connecting the points. The resulting straight line, arbitrarily drawn through the points representing Schott BK7 glass and Schott F2 glass, is referred to as the "normal line for glasses".

"Liquid-lens element" refers to an element, for use in a compound lens, where the element contains at least one optical liquid. The element may be a liquid, ranging in viscosity from a pourable liquid, to a gel, to a solid.

A "compound lens" refers to an optical system in which two or more lenses are used together to reduce the chromatic aberration of a single lens.

"Soluble" as used herein refers to the degree of dissolution of a given amount of a particular solute (typically a solid) in a specific volume of solvent at a specified temperature. In particular, as used herein, the polymer component of the composition is present in an amount effective to completely dissolve in the optical liquid, as determined under ambient conditions (e.g., typically 20°–25° C., 1 atm) by visual inspection (e.g., the resulting solution should appear to be free of particulate matter when viewed with the naked eye). Typically, the polymer is present in an amount from about 2–40 percent by weight polymer in the resulting composition.

"Freezing point" as used herein refers to the temperature at which a material undergoes a phase transition from the liquid to the solid state or vice versa.

II. Optical Lens System

As mentioned above, an apochromatic lens system, as well as lens systems that are color-corrected at more than three wavelengths, requires that at least one of the lens elements be made of a material having an "abnormal" dispersion, which will be described below in reference to FIGS. 2, 3 and 8.

Materials such as calcium fluoride and special glasses that have an abnormal dispersion are expensive and often react chemically with constituents of the atmosphere. Lens elements made from such materials may require special care in grinding and polishing.

To overcome these difficulties, the present invention provides a polymer composition having an abnormal dispersion for use as a liquid element in a compound lens. The liquid lens element is fabricated from a material which is low cost and chemically stable.

Figure 1B:
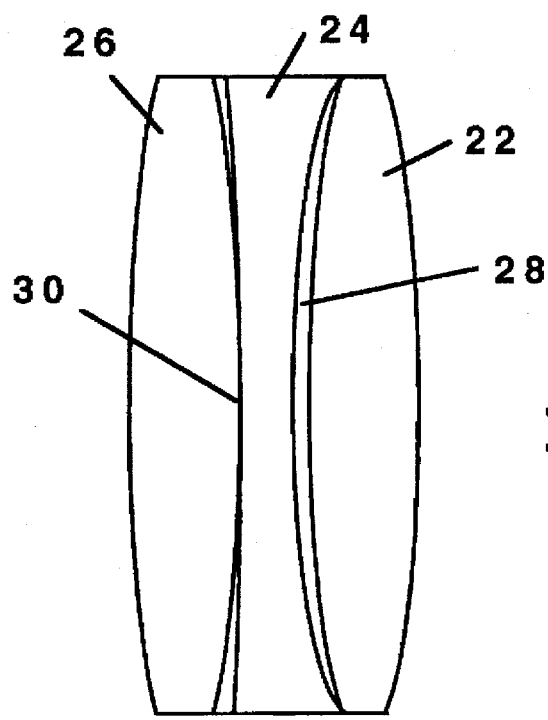

FIG. 1A shows a compound lens 10, constructed according to one aspect of the invention, having two rigid optical lenses 12, 14. One of the lenses is a converging lens and the other is a diverging lens. The lenses are fabricated from materials that are commercially available, such as the commonly used glasses Schott BK7 and F2 (Schott Optical Glass Company, Duryea, Pennsylvania). The lenses 12, 14 may be constructed of the same or different materials. These glasses are generally inexpensive and have a normal dispersion, although glasses having abnormal dispersive characteristics may also be used. Although the thin lens elements as shown in FIGS. 1A and 1B are in contact, they may optionally be separated by a thin airspace. The thickness of the lens elements will vary depending upon the optical power of the elements, the lens system design, and the number and types of lens elements.

Carried in a sealed space between the two rigid lenses is liquid-lens element 16. Element 16 is a polymer composition containing an abnormal optical liquid, to be described in more detail later. In general, the viscosity of the polymer composition is at least an order of magnitude greater, i.e., higher, than the viscosity of the optical liquid alone. The viscosity of the polymer composition can, to a certain extent, be tailored, as the type and amount of polymer will determine the viscosity of the composition. The higher viscosity of the polymer composition relative to the optical liquid alone allows for easier fabrication of the compound lens.

According to an important feature of the invention, the polymer composition has an abnormal optical dispersion. The optical liquid alone exhibits an abnormal dispersion and when combined with the polymer, results in a composition that is abnormally dispersive and effective to correct chromatic aberrations. The polymer composition is also transparent throughout the visible spectrum.

Seen in FIG. 1B is an alternate embodiment of a compound lens containing the polymer composition of the invention. Here, the compound lens is composed of three rigid glass lens elements, 22, 24, 26. The glass lens elements are typically made of at least two different optical glasses. The liquid-lens elements, 28, 30 are formed of a polymer composition containing an abnormal optical liquid. The composition of the liquid lenses 28, 30 may be the same or different, depending upon the control of chromatic aberration desired.

The selection of optical glasses for use as rigid lens elements for achieving color correction will depend on a number of factors, such as the type of compound lens, the degree of color correction desired, the polymer composition of the liquid lens, as will be appreciated by one skilled in the art. Methods for selecting glasses and combinations of glasses for use in optical systems have been previously described (Herzberger, et al. 1949; Herzberger, 1959; Herzberger, et al. 1963; Lessing, 1957, 1958, 1959a, 1959b; Stephens, 1957, 1959, 1960). The design of optical systems corrected at two or more wavelengths, including the selection of compatible optical components, optimization of geometrical parameters (e.g., thicknesses, radii of curvature, spacings) is described in U.S. Pat. No. 5,033,831 (Sigler, 1991) and in U.S. Pat. No. 4,958,919 (Sigler, 1990), the contents of which are herein incorporated by reference. One representation of the optical dispersion of a material over the visible spectrum is by means of Buchdahl's dispersion model (Sigler 1990a, Sigler 1991a). Using the Buchdahl model, the dispersion coefficients of a material are determined by the composition of the material only and are independent of wavelength. The quantities $\eta_1$ and $\eta_2$ are called the primary and secondary dispersive coefficients, respectively, determined using a quadratic representation of the Buchdahl model. As used herein, a Buchdahl plot or Buchdahl dispersion map is a plot of $\eta_1$, (vertical axis) and $\eta_2$ (horizontal axis) values for any given optical material, as shown in FIG. 2.

Figure 2:
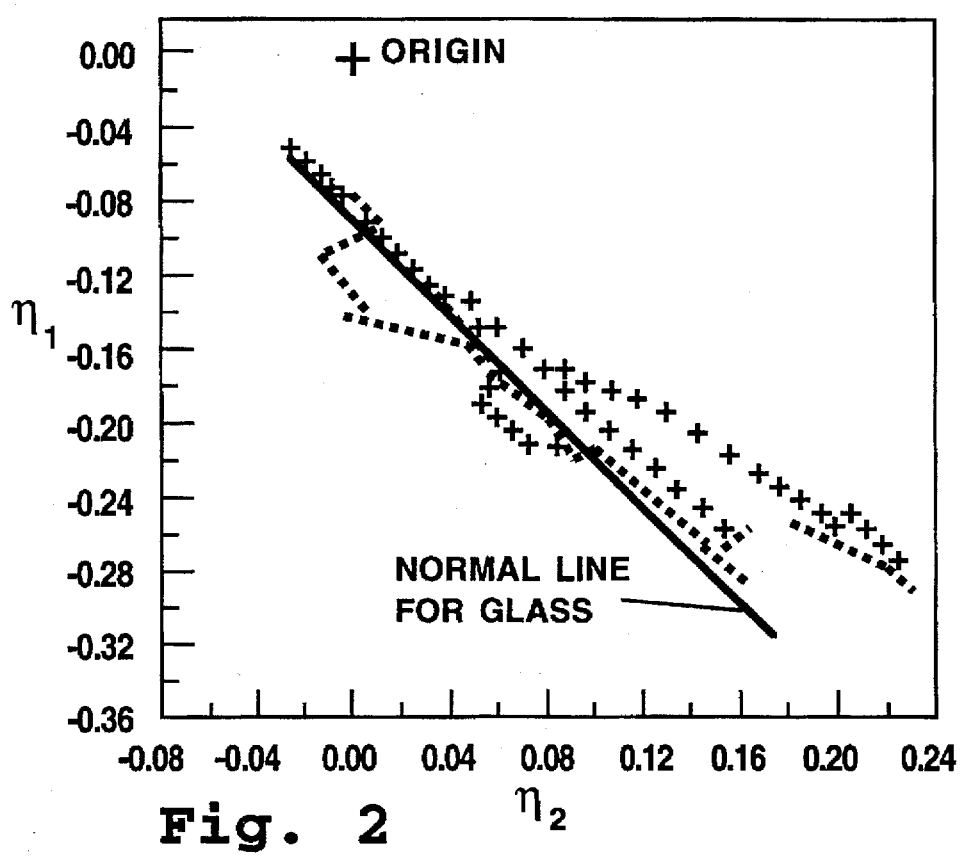
FIG. 2 is a plot of the primary and secondary dispersion coefficients ($\eta_1$, $\eta_2$) resulting from application of the Buchdahl model for Schott glasses and commercially available optical liquids.

FIG. 2 is a plot of the primary and secondary dispersion characteristics of various commercially available glasses and optical liquids. The straight line, formed by connecting the points representing two readily available glasses known to have normal dispersion, Schott BK7 and Schott F2, is generally referred to as the "normal line for glasses". Most optical glasses tend to lie along this line and are said to have a normal dispersion. Materials that lie off the line are said to have an abnormal dispersion. As used herein, a material having an abnormal dispersion and characterized by a point ($\eta_2$, $\eta_1$) on a Buchdahl plot lies a distance along the horizontal axis from the normal line for glasses ($\Delta\eta_2$) of at least 0.01 units. The greater the distance from the normal line, the greater the degree of abnormality.

The points in FIG. 2 represent commercially available optical liquids (Cargille Laboratories, Cedar Grove, N.J.). Relative to the normal line for glasses, it is clear that many liquids display an abnormal dispersion.

III. Polymer-Optical Liquid Matrix

In accordance with the invention, a polymer composition composed of a polymer and an abnormal optical liquid for use as a liquid-lens element in a compound lens is described. The following sections will describe methods for preparing the polymer composition, and the selection of an abnormal optical liquid and of a polymer for use in the polymer composition of the present invention.

A. Polymer-Optical Liquid Matrix

The polymer composition of the present invention can be formed according to several methods, as will be discussed below. Further, the optical liquid can be entrapped or incorporated into the polymer according to several schemes, as illustrated in FIG. 4.

FIG. 4A illustrates preparation of the polymer matrix by blending or mixing a polymer 40 with an optical liquid 42. The optical liquid and the polymer are soluble to some extent and are blended to give a mixture 44 that is a viscous liquid, a gel, a semi-solid or an amorphous glass. The resulting polymer composition possesses a viscosity that is at least an order of magnitude greater than that of the optical liquid alone, and is preferably at least 5–6 orders of magnitude greater. As a result of the blending, the optical liquid is entrapped within the polymer chains or molecules and is held therein. Example 2 describes the blending of a number of polymer additives with exemplary optical liquids.

FIG. 4B illustrates preparation of a polymer matrix by blending the optical liquid 46 with a polymer 48 that has either active crosslinking sites or sites that may be activated upon addition of a chemical crosslinking agent. A bifunctional or multifunctional crosslinking reagent, including oxidizing agents (e.g., organic peroxides, nitro compounds) or free radical generators (e.g., azo compounds, accelerators), may be added to the polymer and optical liquid mixture 50 to promote crosslinking or curing. The crosslinking reagent reacts with the polymer under appropriate conditions, such as exposure to heat or light, or may react spontaneously. The crosslinked polymer chains, such as crosslink 51, form a network or matrix 52 in which the optical liquid is entrapped.

With continuing reference to FIG. 4B, the optical liquid may also be blended with a monomer and an appropriate initiator. Under appropriate conditions, such as exposure to light or heat, the monomer polymerizes to form a network of polymer molecules. The optical liquid is entrapped within the matrix of polymer chains.

The preparation of poly(ethylcinnamate) by polymerization of ethyl cinnamate is one such exemplary method for forming the polymer-optical liquid matrix of the present invention. Based upon the description above, ethyl cinnamate acts as both the abnormal optical liquid component as well as the monomer used to form the resulting composition. Ethyl cinnamate can be polymerized into a viscous solution or a gel, depending upon the pressure at which the polymerization is carried out, using azoisobutyronitrile as an initiator (Hemmings, et al., 1986; Marvel, et al., 1953). The resulting polymer mixture typically contains unreacted (i.e., non-polymerized) ethyl cinnamate and may be used directly to provide the desired polymer composition, or alternatively, may be combined with other additives to provide the desired characteristics of the final polymer composition.

In another embodiment, the optical liquid may be covalently attached to the polymer chains. This is illustrated in FIG. 4C, where the optical liquid 56 is mixed with the polymer 58. Prior to blending, the polymer and/or the optical liquid is activated with a reactive functional group (if not already present) and upon blending, the optical liquid covalently attaches to the polymer chain, either at a backbone or side chain position.

In carrying out one such exemplary coupling reaction, a functionalized polymer, such as one modified to contain reactive N-hydroxysuccinimide ester sites, is reacted with a primary amine-containing optical liquid to form a polymer-optical liquid coupled material, attached via covalent amide bonds (while releasing N-hydroxysuccinimide).

As discussed above, many abnormal optical liquids contain one or more reactive functional groups, suitable for either direct coupling to an activated polymer or for further derivatization prior to polymer coupling. Optionally, an abnormal optical liquid may be coupled to a polymer through an intervening spacer or cross-linker arm, such as those commonly employed in the art. Commonly available cross-linkers contain terminal reactive functional groups (e.g., homobifunctional or heterobifunctional cross-linkers) such as hydrazide, azide, primary amino, succinimidyl, and the like, for coupling to a variety of reactive materials.

Functionalized polymers are also commercially available, such as brominated polystyrene (Great Lakes Chemical Corp., West Lafayette, Ind.) and sulfonated polystyrene (National Starch, Bridgewater, N.J.).

The degree of covalent attachment may be controlled by regulating the number of active sites contained within the polymer resin. This is illustrated in FIG. 4C at 60 where the optical liquid is chemically bonded to the polymer to thereby form, in one embodiment, the derivatized polymer component of the present invention. In some instances, a percentage of the reactive sites on the polymer will remain unreacted, and the excess abnormal optical liquid, in free form, will provide the abnormal optical liquid component of the polymer composition of the invention. Alternately, a different optical liquid may be added to the derivatized polymer composition to provide the polymer composition.

In each of the above embodiments, dispersing the polymer in the optical liquid results in a polymer composition characterized by a viscosity that is at least one order of magnitude greater than that of the optical liquid alone, and is preferably 5–6 orders of magnitude greater. The viscosity and nature of the matrix will depend on several factors, such as the molecular weight of the polymer, the amount of the polymer added and the molecular interactions of the optical liquid with the polymer.

Altering the molecular weight of the polymer is one manner of altering the viscosity of the resultant polymer composition. Typically, polymers for use in the present invention will have a molecular weight between 10–1000 kDaltons. Alternatively, one can modify the amount of polymer present in the polymer composition. Depending upon the molecular weight of the polymer, the polymer composition will generally contain about 2–40 weight percent polymer.

To prepare a matrix that is highly viscous or approaching a semi-solid, a high molecular weight of the polymer can be used (e.g., 100–1000 kDaltons), and typically in smaller amounts (e.g., 2–20 weight percent). Alternately, a larger amount (e.g., 20–40 weight percent) of a lower molecular weight polymer (e.g., 10–100 kDaltons) may be used.

Blending an abnormal optical liquid with a normally-dispersive polymer will result in a polymer matrix having an abnormal dispersion when the two components are blended in appropriate concentration ranges. As discussed above, the polymer composition of the invention typically contains from about 2–40 percent polymer by weight. Effective concentration ranges will depend on the abnormality of the optical liquid and the solubility of the resulting mixture. In order to form a polymer composition having an abnormal optical dispersion, a polymer component can be added in greater proportions to an optical liquid which is highly abnormal than when added to a liquid which is not as highly abnormal.

B. Abnormal Optical Liquid Selection

In choosing an optical liquid to include in the polymer composition of the present invention, the dispersive characteristics of the liquid must first be examined. The dispersion characteristics of a material are determined by measuring the refractive index, typically using an Abbe refractometer. The refractive index is measured at numerous wavelengths (e.g., typically at four to six different wavelengths) across the intended spectrum of operation, and typically at wavelengths in the visible spectrum from about 0.44 to 0.63 µm. Often, refractive index values are provided by the supplier (e.g., Cargille). This data is then fitted to a quadratic Buchdahl dispersion model (Robb, et al., 1990) and the dispersion is presented in a Buchdahl dispersion map as shown in FIGS. 2, 3, and 8. As discussed above, a material is more abnormal when it is farther away from the normal line for glasses.

One approach for identifying liquids as likely candidates for having an abnormal dispersion is to identify compounds having intense near infrared (IR) or ultraviolet (UV) absorption bands. Abnormal optical liquids often have increased dispersion in the long wavelength end of the visible region due to intense near IR absorption bands or increased dispersion in the visible region due to intense near UV bands.

Figure 3:
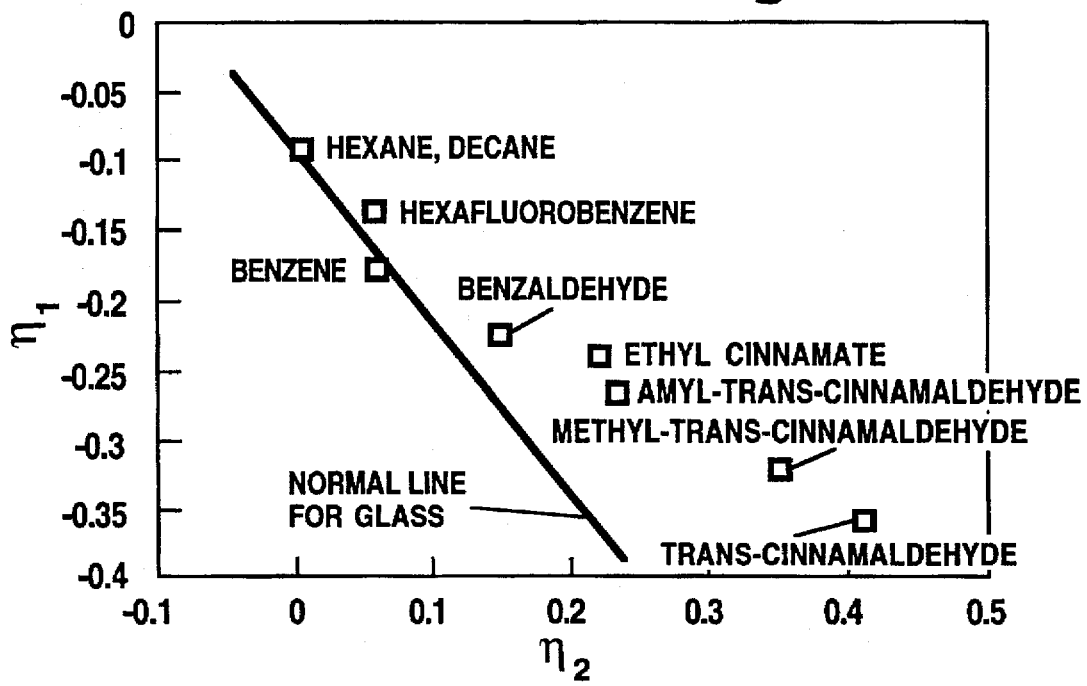
FIG. 3 is a Buchdahl dispersion plot showing the dispersion properties of various liquids.

Shown in FIG. 3 is the normal line for glasses, along with the relative dispersion of several optical liquids (open squares), some of which are appropriate for use in the present invention (i.e., those which lie a distance of at least 0.01 units along the horizontal axis from the normal line). The liquids shown include representative linear hydrocarbons and aromatic hydrocarbons, including cinnamic acid derivatives.

As illustrated in FIG. 3, the linear hydrocarbons tend to cluster around the upper left hand corner of the Buchdahl plot while aromatic hydrocarbons tend to spread down the lower right hand side of the plot, and in general, are somewhat removed from the normal line for glass.

The materials in the lower right hand corner of the plot are considered to be highly abnormal and very dispersive, and are preferred materials for use in the present invention. Such materials include derivatives of cinnamic acid, such as the corresponding aldehyde and alkyl ester derivatives. Preferred cinnamate optical liquids include ethyl cinnamate, amyl-trans-cinnamaldehyde, para-methoxycinnamic acid, isoamyl ester (not shown), methyl-trans-cinnamaldehyde and N,N-dimethylamino(trans-cinnamaldehyde) (not shown) and other like materials having similar abnormal optical properties.

Cinnamate optical liquids are commercially available (e.g., Aldrich, Milwaukee, Wis.; Haarman & Reimer, Springfield, N.J.) under trade names such as Neo Heliopan E1000.

The optical liquids may be used alone or in combination to provide the abnormal optical liquid component for use in the compound lens composition of the present invention. Many of the commercially available refractive index liquids, such as those obtained from Cargille Laboratories, are sold as blends (i.e., they contain more than one component).

Many optical dispersion liquids are highly unsaturated and possess one or more aromatic or heteroaromatic rings. Most optical liquids contain one or more functional groups, such as amino, hydroxyl, cyano, carbamoyl, carbonyl, imino, sulfo, carboxy ester, amido, and the like. Exemplary optical compounds for use in the present invention include N-methylpyrrolidone [5F]; 4-(methylphenylamino) methylene(amino)-benzoic acid ethyl ester [5C]; 4-(ethylphenylamino)methylene-amino-benzoic acid, ethyl ester [5G]; trans-1-(4-pyridinyl)-2-(2-thiophenyl)ethane [5E]; 5-methyl-2-(1-methylethyl)cyclohexanol-2-aminobenzoate [5H]; paramethoxycinnamic acid, isoamyl ester [5I]; Neo Heliopan Hydro [5J]; 2-cyano-3,3-diphenyl-2-propenoic acid, 2-ethylhexyl ester [5N]; 3-(4-methylbenzylidene)-d-1-camphor [5O]; (2-hydroxy-4-methoxyphenyl)phenyl-methanone [5K]; (2,4-dihydroxyphenyl)-phenyl-methanone [5L]; 2-cyano-3,3-diphenyl-2-propenoic acid ethyl ester [5M]; 3-(2H-benzotriazol-2-yl)-5-(1,1-dimethylethyl)-4-hydroxy-benzenepropanoic acid, C7-9-branched esters [5P]; α-[3-[3-(2H-benzotriazol-2-yl)-5-(1,1-dimethylethyl)-4-hydroxyphenyl]-1-oxopropyl]-ω-[3-[3-(2H-benzo-triazol-2-yl)-5-(1,1-dimethylethyl)-4-hydroxyphenyl]-1-oxopropoxy]-poly(oxy-1,2-ethane diyl) [5Q]; 2-(2H-benzotriazol-2-yl)-4,6-bis(1-methyl-1-phenylethyl)phenol [5R]; N-(2-ethoxy-phenyl)-N'-(2-ethylphenyl)-ethanediamide [5S]; N-(2-ethoxyphenyl)-N'-(4-isodecylphenyl)-ethane diamide [5T]; 1,2-bis (3-5-di-tert-butyl-4-hydroxyhydrocinnamoyl)hydrazine [5U]; tetrakis [methylene (3,5-di-tert-butyl-4-hydroxyhydrocinnamate)] methane [5V]; and 2-(2'-hydroxy-3'-5'-di-tert-amylphenyl) benzotriazole [5W].

Figure 5A:
FIGS. 5A–5W show the structures of exemplary components of optical liquids in accordance with the present invention.
Figure 5B:
Figure 5E:
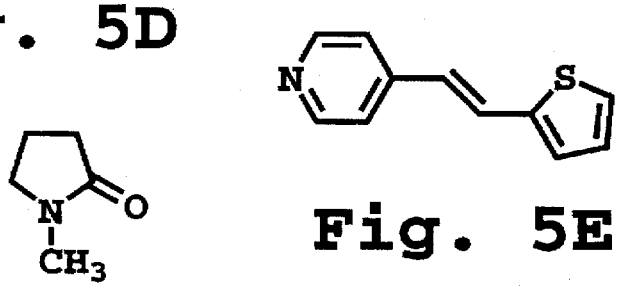
Figure 5H:
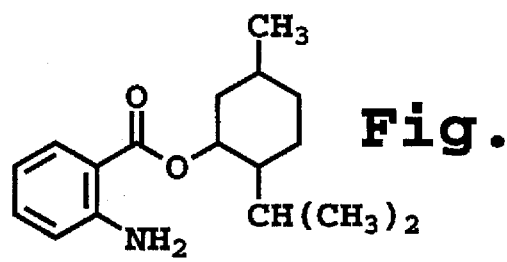
Figure 5I:
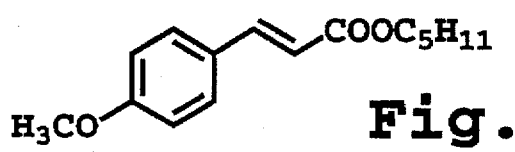
Figure 5J:
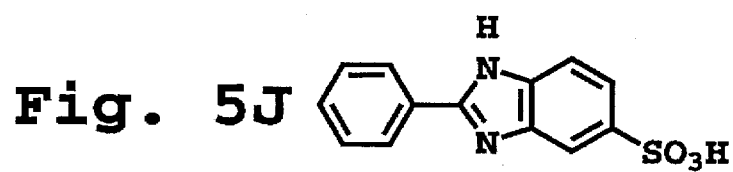
Figure 5K:
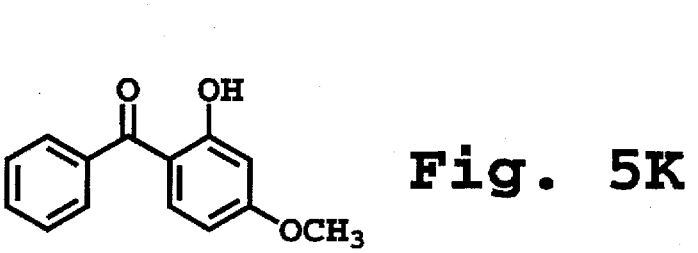
Figure 5L:
Figure 5M:
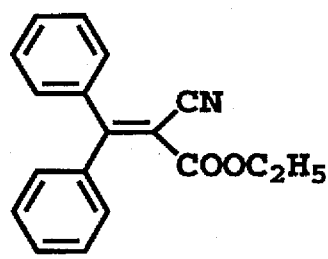
Figure 5S:
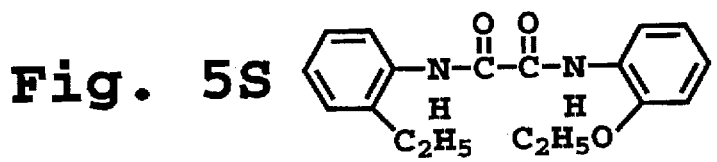

Table 1 includes a list of several of the above-mentioned optical liquids, including their respective trade names (if applicable) and structure reference numbers, also indicated above in square brackets. The corresponding structural formulae are shown in FIGS. 5A–5W.

The optical dispersion of several liquids was measured as described above. The results are summarized in Table 5 and plotted as the corresponding $\eta_1$ and $\eta_2$ values in a Buchdahl dispersion plot as shown in FIG. 8.

Several of the above optical liquids and combinations of optical liquids were found to be highly dispersive, and are thus preferred for use in the present invention.

Figure 8:
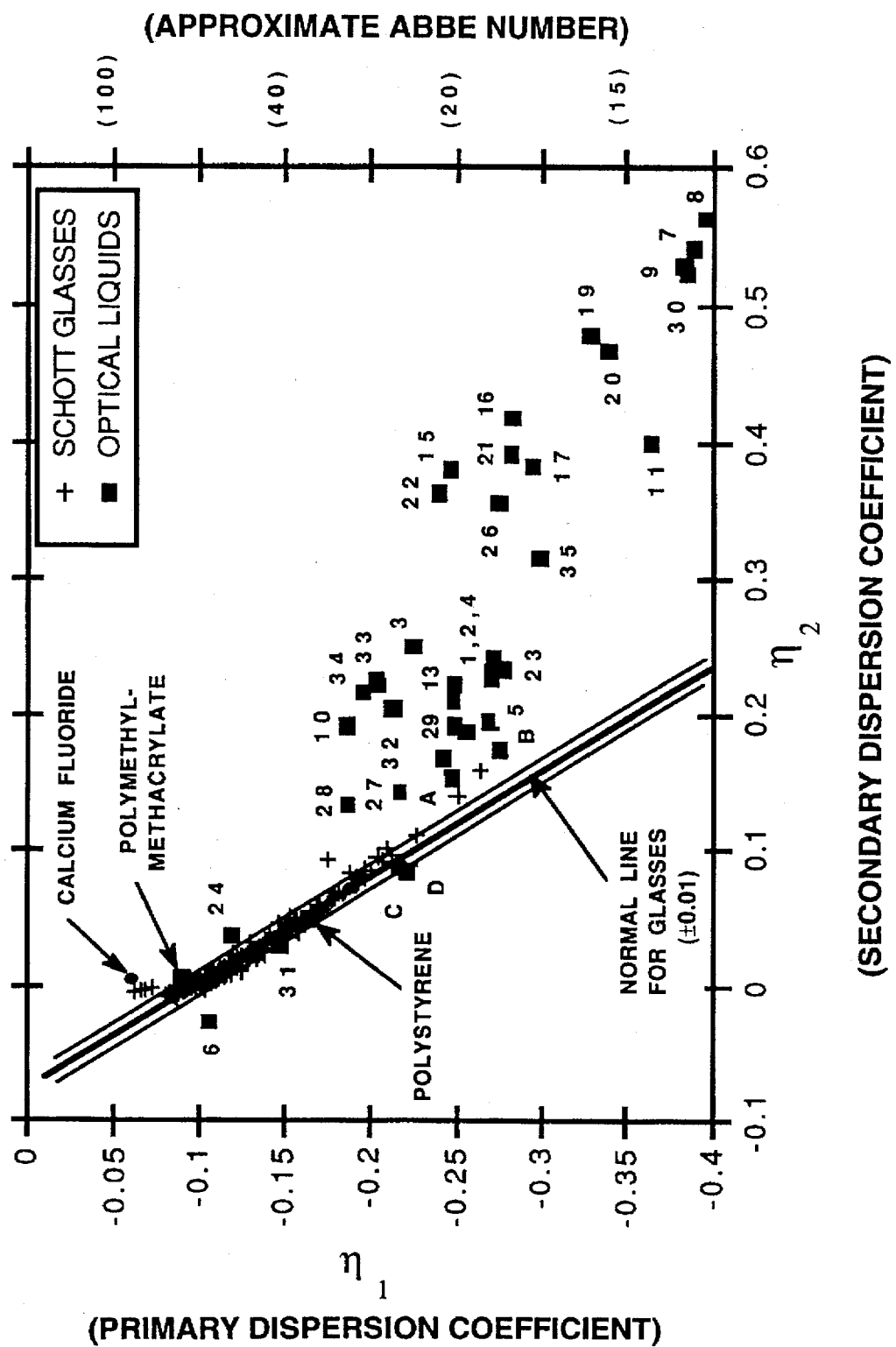
FIG. 8 is a Buchdahl dispersion map illustrating the optical dispersive properties of various optical liquids, combinations of optical liquids, and optical liquid/polymer compositions in accordance with the invention.

Referring now to FIG. 8, looking at the cluster of points on the Buchdahl dispersion plot that lie the furthest distance along the horizontal axis from the normal line for glasses (e.g., points 19, 20, 30, 9, 7, 8, 35, 22, 15, 26, 21, 16, 17, and 11), and which correspond to the following media, respectively: 50% Tinuvin 1130 in GIVSORB UV1, 48% Tinuvin 384 in GIVSORB UV1, 10% GIVSORB UV2 in GIVSORB UV1, 4% ethyl cinnamate in GIVSORB UV-1, GIVSORB UV1, and 3.2% cis-1-(4-pyridyl)-2-thiophenylethene in GIVSORB UV1, Neo Heliopan E1000, Tinuvin 1130 (25° C.), Tinuvin 1130 (20° C.), 50% GIVSORB UV2 in N-methylpyrrolidone, Tinuvin 384 (25° C.), Tinuvin 384 (20° C.), 9.8% Tinuvin 328 in Tinuvin 384, and trans-cinnamaldehyde, these media are particularly preferred for use in the present invention due to their highly abnormal dispersive properties. All of the points in this group lie a distance of between about 0.1–0.25 units from the normal line for glasses along the horizontal axis.

In selecting an optical liquid, or tailoring an optical liquid for use in the present polymer composition, alkyl group substitution, that is replacing a hydrogen atom with a linear or branched hydrocarbon group, may permit some degree of control of optical dispersion along with other relevant physical properties, such as freezing temperature. For instance, the α-methyl and α-amyl (pentyl) derivatives of trans-cinnamaldehyde are shown in FIG. 3. It can be seen that substitution with a longer alkyl group at C2, α-amyl in this case, reduces the abnormality in dispersion. Although optical liquids having a high degree of abnormality are the most preferred for use in the present invention, after identifying such liquids, secondary characteristics such as freezing point and solubility properties should also be considered.

In considering their respective freezing points, the freezing temperatures for trans-cinnamaldehyde and its methyl and amyl-substituted derivatives are 5° C., 3° C., and −1° C., respectively. Lower freezing temperatures are preferred for the optical liquids of the present invention as crystallization of the liquids may be detrimental to optical performance. The relative freezing point behavior of several exemplary abnormal optical liquids and mixtures of optical liquids at −40° C. is summarized in Table 2.

In pure form, many small molecules possess relatively high freezing points. However, introduction of a second component to a pure substance, even in minor amounts, generally disrupts the crystallization process and results in a lowering or depression of the freezing point. Given similar abnormal dispersions, optical liquids or mixtures of optical liquids having low freezing points (e.g., below about −40° C.) are preferred. Such low-freezing materials remain in the liquid phase to much lower temperatures (e.g., do not become opaque) and are preferred for lens systems intended for use under extreme environmental conditions (e.g., telescopic lens systems for use in arctic regions such as the South pole).

Returning to Table 2, several abnormal liquids remain in liquid form down to −40° C., including GIVSORB UV-1 [5C], Tinuvin 1130 [5Q], Sanduvor 3206 [5T], Sanduvor 3212 (structure unavailable, Sandoz Chemical, Charlotte, N.C.), Neo Heliopan MA [5H] and Neo Heliopan 303 [5N].

Preferred combinations of optical liquids which showed no signs of crystal formation when cooled to −40° C. include mixtures of i) triacetinpolyacenaphthalene-ethyl cinnamate (41:5:54); ii) Tinuvin 383-Givsorb UV-1 (48:52); iii) Tinuvin 1130 Givsorb UV-1 (50:50); iv) Neo Heliopan MA-GIVSORB UV-1 (50:50); Univul 3000-N-methylpyrrolidone (50:50); Univul 3040-N-methylpyrrolidone (50:50); and ethyl cinnamate-GIVSORB UV-1 (5:95).

At temperatures below about −40° C., some optical liquids or combinations of optical liquids may form amorphous glasses. These materials are also suitable for use in lens systems for use under extreme environmental conditions, as long as they remain transparent (e.g., non-opaque) to the desired operating temperatures.

Aqueous solutions of many inorganics display abnormal optical dispersion characteristics (Petrova, et al., 1992), including aqueous solutions of salts such as sodium chloride, aqueous acids (e.g., hydrochloric acid, sulfuric acid, phosphoric acid), and aqueous bases (e.g., sodium and potassium hydroxide). Although abnormal dispersion liquids, these solutions are not generally preferred for use in the invention because of their corrosive nature and relatively high freezing points.

One other important parameter for consideration in selecting an optical liquid component for use in the present invention is the liquid's solubility properties. In this regard, the solubility parameter, $\delta$, (expressed in $(cal/cm^3)^{1/2}$) is a useful measure for determining the compatibility of an optical liquid with i) one or more other optical liquids, and/or ii) one or more polymers. In forming the polymer composition of the present invention, the polymer must be soluble in the optical liquid and the resulting optical liquid-polymer solution should not result in phase separation.

Ideally, both the optical liquid of choice and the polymer for use in the invention should possess solubility parameters within a similar range as described below. In general, materials with solubility parameters within a similar range will be soluble. Typically, optical liquids for use in the present invention will possess solubility parameters between about 8 and 14.

The solubility parameter of organic materials can be calculated using group contribution methods, as described by Van Krevelen (1990). For example, the solubility parameter of ethyl cinnamate was calculated to be 9.9 $(cal/cm^3)^{1/2}$. The solubility parameters for n-propyl cinnamate and iso-propyl cinnamate are 9.8 and 9.7 $(cal/cm^3)^{1/2}$, respectively.

Table 3 summarizes the solubility of two-component systems containing ethyl cinnamate and either a polymer or secondary optical liquid additive. The solubility of various polymers in ethyl cinnamate will be discussed in greater detail below.

B. Polymer Selection

Polymers for use in the present invention are those which i) are soluble, at least to some extent, in the abnormal optical liquid for use in the composition, ii) are effective to impart a viscosity that is at least an order of magnitude greater than that of the optical liquid alone at a selected temperature (e.g., room temperature), and iii) when blended with the abnormal optical liquid, do not reduce the optical dispersion value of the resulting composition below ±0.01 dispersion units from the normal Buchdahl dispersion line for glasses.

Such polymers include crystalline, glassy and rubbery polymers. Other suitable polymers include water-soluble polymers such as poly(oxyethylene), polyacrylamide, hydroxypropylcellulose, polyvinyl alcohol, and polyethylene glycol. The polymer may optionally be crosslinked after mixing with the abnormal optical liquid. Generally, the polymer component is blended or reacted, in a manner to be described, with the abnormal optical liquid to form the polymer composition of the invention.

One approach to determining the solubility or compatibility of a polymer in an abnormal optical liquid is to match the solubility parameter of the liquid to the solubility parameter of the polymer. The solubility parameter of a given polymer can be calculated, as described above for optical liquids, or can be found in a reference book, such as the *Polymer Handbook* (Brandup and Immergut, 1989). Typically, and in the absence of strong interactions such as hydrogen bonding, solubility can be expected if the difference in solubility parameters is less than about 1.7–2, although other factors (e.g., entropic factors, crystallinity, crosslinking) may affect the solubility of a polymer in a given solvent.

For use in combination with an exemplary optical liquid such as ethyl cinnamate, the polymer will ideally have a solubility parameter in the range of the alkyl cinnamates, e.g., about 8–11 $(cal/cm^3)^{1/2}$.

Suitable polymers for use in the invention include aliphatic and aromatic hydrocarbons such as polyethylene and polystyrene. Polymers having main chain cyclic units such as poly(acenaphthalene) may also be used. Further exemplary polymers include heteroatom-containing polymers such as polymethylmethacrylate, polycarbonate, olyoxyethylene, polyurethane, polyvinylcinnamate, polyvinyl alcohol, and polyacrylamide; polymers containing silicon such as polydimethylsiloxane; and halogenated polymers such as polytetrafluoroethylene. Alternately, the polymer may be a cellulosic polymer such as hydroxypropyl cellulose, or a co-polymer such as poly(butadiene-co-acrylonitrile).

Additional polymers for use in the present invention include polymers of esters of cinnamic acid such as polyethylcinnamate, polymethylcinnamate, and polyvinylcinnamate, the preparation of which have been described previously (Marvel, et al., 1953; Hemmings, et al., 1986).

Generally, the above polymers each have solubility parameters in the range of about 8–14 $(cal/cm^3)^{1/2}$ (Brandup and Immergut, 1989). For example, the solubility parameters of polyethylene, polystyrene, poly(methyl methacrylate) are 7.9, 8.6, and 9.1 $(cal/cm^3)^{1/2}$, respectively (Billmeyer, 1971). One exception are siloxane polymers, which have solubility parameters of about 5–6 $(cal/cm^{3 1/2}$, for use in siloxane-based optical liquids.

Once having identified a potential polymer-abnormal optical liquid combination on the basis of similar solubility parameter values, the polymer and abnormal liquid are then mixed in different proportions to determine the extent of solubility of the polymer in the optical liquid.

Tables 3 and 4 contain solubility data for compositions containing one or more optical liquids and a polymer. Referring to Table 3, the following polymers were found to be soluble in ethyl cinnamate at the proportions described below: polyvinylcinnamate (2.1 and 6.5% by weight), polyacenaphthalene (3.4%, 9.3%), polymethylmethacrylate (25.3%), and polystyrene (40.4%, 26.4%, and 23.6%).

As illustrated in Table 4, compositions containing two different optical liquids and a polymer component were also found to be soluble. Such soluble polymer compositions included polyvinylcinnamate-ethyl cinnamate (4.8:41 percent by weight) in triacetin and polymethylmethacrylate (26.3%) and ethyl cinnamate (53%) in triacetin.

The polymer selected may have a normal or abnormal dispersion, as long as the resulting polymer composition has an abnormal dispersion (e.g., lies a distance of at least ±0.01 units along the horizontal axis of a Buchdahl dispersion plot from the normal line for glasses). It has been found that many polymers have a normal dispersion. The optical dispersion values of exemplary polymers are provided in FIG. 8. and in Table 5.

IV. Properties of Polymer-Optical Liquid Matrix

The polymer composition of the present invention, composed of an abnormal optical liquid and a polymer, is characterized by an abnormal optical dispersion and a viscosity that is increased by at least one order of magnitude over that of the optical liquid alone. Further, the composition should be transparent in the visible region of the spectrum. In a preferred embodiment, the polymer composition is further characterized by a freezing point that is depressed by at least about 5° C. below that of the optical liquid alone.

In support of a preferred embodiment of the present invention, various compositions of polystyrene in ethyl cinnamate were prepared and differential scanning calorimetry (DSC) was performed on matrices prepared from these components as described in Example 3. Differential scanning calorimetry (DSC) was performed and viscosity as a function of temperature was measured. The DSC thermograms are shown in FIGS. 6A–E.

Figure 6A:
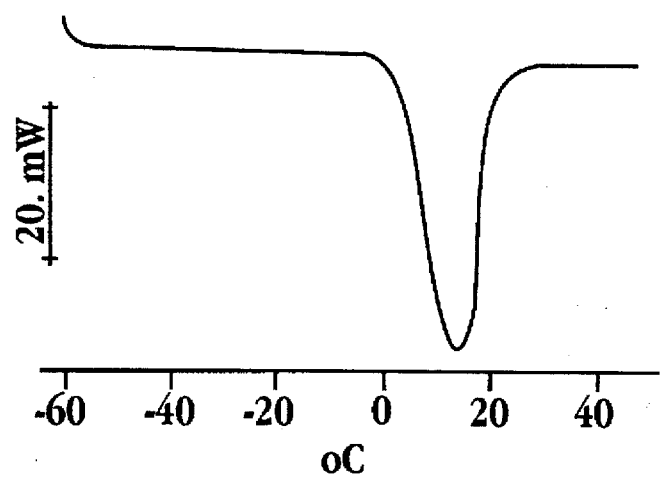
FIGS. 6A–6E are differential scanning calorimetry (DSC) thermograms of polymer compositions formed of polystyrene/ethyl cinnamate, where the wt % of polystyrene is 2.0% (FIG. 6A), 4.8% (FIG. 6B), 9.1% (FIG. 6C), 17% (FIG. 6D) and 23% (FIG. 6E)
Figure 6B:
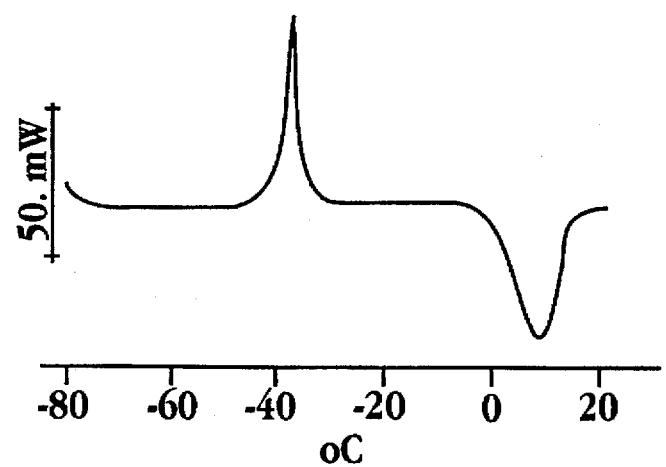
Figure 6C:
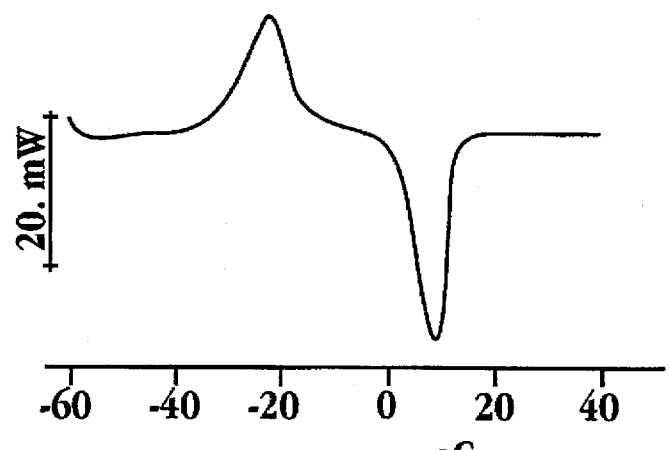
Figure 6D:
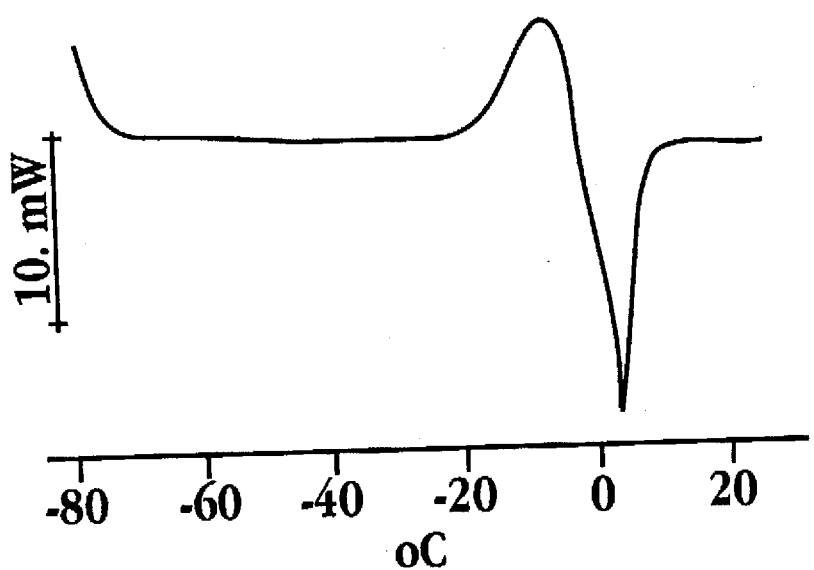
Figure 6E:
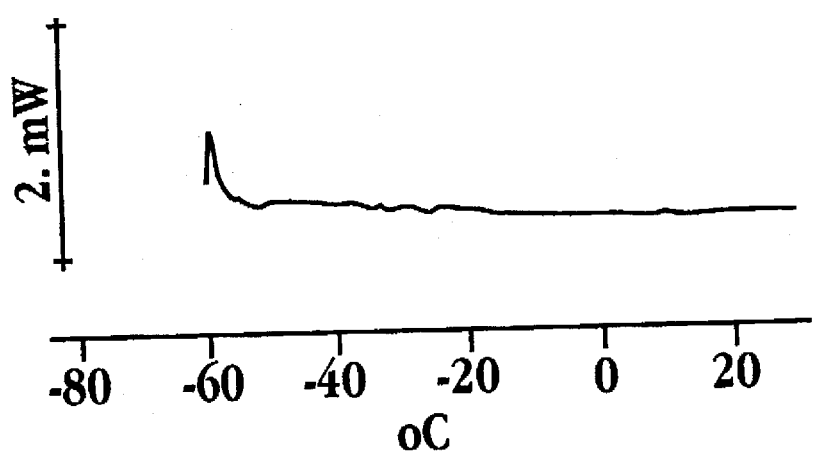

FIG. 6A shows a thermogram for the 2% polystyrene/ethyl cinnamate matrix, and a single endotherm corresponding to a thermal transition (e.g., melting point) of ethyl cinnamate is observed.

The thermogram of the 4.8% polystyrene/ethyl cinnamate composition (FIG. 6B) shows a melting endotherm at about 13° C. and an exotherm at about −35° C. The exotherm corresponds to a thermal transition occurring in the polymer matrix. The mixtures containing 9.1% (FIG. 6C) and 17% (FIG. 6D) polystyrene show similar endotherms and exotherms, however the two peaks are closer together as the amount of polystyrene in the sample is increased. At 23% polystyrene (FIG. 6E), the high temperature endotherm is absent from the DSC scan, indicating that the ethyl cinnamate is entirely entrapped within the polymer molecules. The disappearance of the endotherm and simultaneous appearance of a low temperature exotherm at approximately −60° C. further indicates a shift in the thermal property of the resulting composition and a depression of the melting point of the resulting composition by nearly 75° C.

Figure 7:
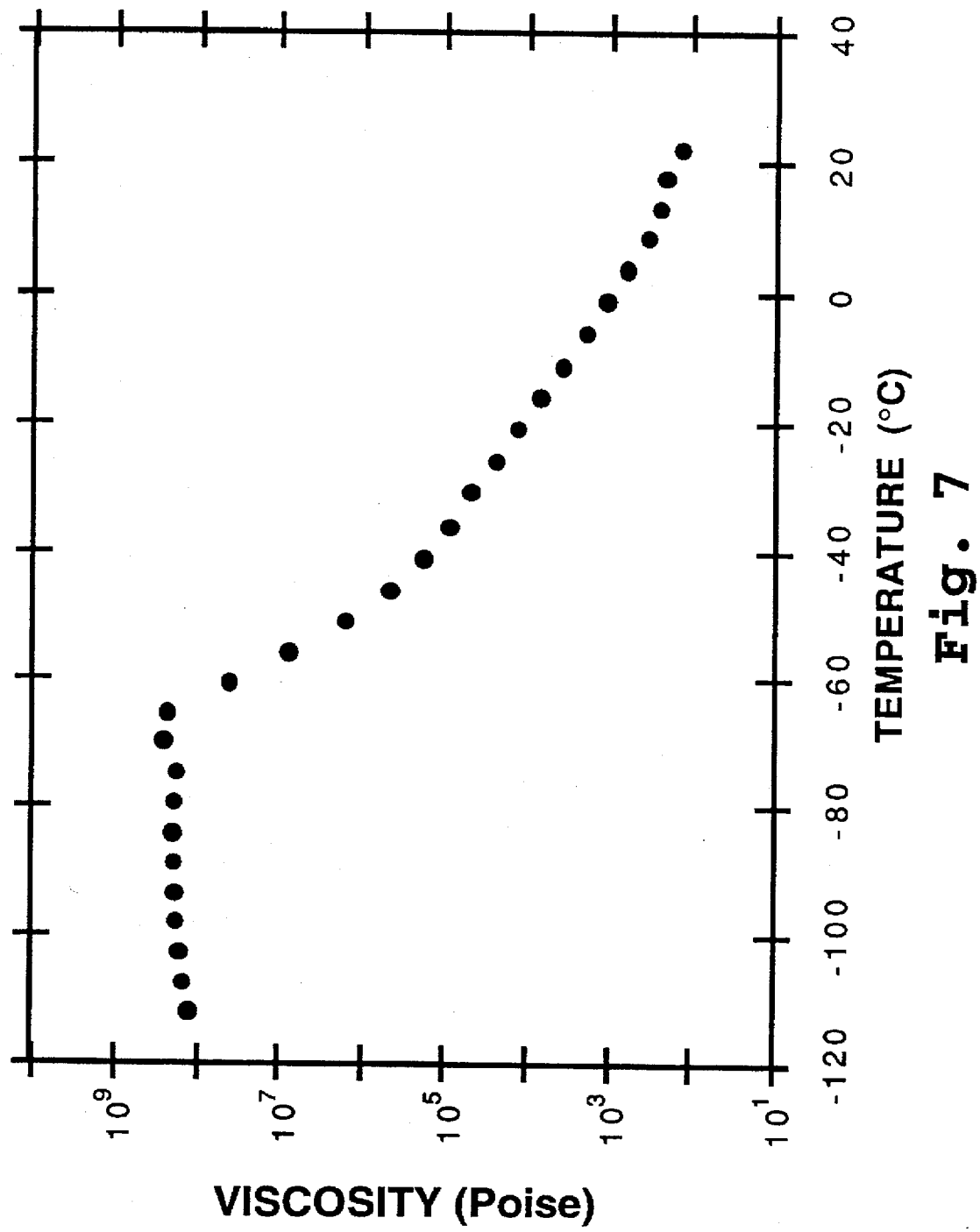
FIG. 7 demonstrates viscosity, in Poise, as a function of temperature, in ° C., for a 23% polystyrene ethyl cinnamate polymer composition.

Viscosity as a function of temperature for a 23% polystyrene/70% ethyl cinnamate polymer composition is shown in FIG. 7. At temperatures below about −55° C., the viscosity of the composition is constant at about $3 \times 10^8$ Poise. As the temperature increases from −55° C. to 25° C., there is a decrease in viscosity to about 100 Poise. In contrast, the viscosity of ethyl cinnamate alone, at room temperature, is less than 0.01 Poise.

Returning to an essential feature of the composition, the polymer composition of the present invention is characterized by an abnormal optical dispersion as has been described above. In general, upon adding a polymer component to an abnormal optical liquid characterized by values for the primary and secondary dispersion coefficients of $\eta_{1liq}$ and $\eta_{2liq}$, the resulting composition will have an optical dispersion characterized by new values of $\eta_{1comp}$ and $\eta_{2comp}$. However, for the new value of $\eta_{1comp}$ for the composition, the distance of $\eta_{2comp}$ along the horizontal axis from the normal line for glasses is at least ±0.01 dispersion units.

Tables 5 and 6 summarize the values of $\eta_1$, $\eta_2$, and $\Delta\eta_2$ for a number of optical liquids, mixtures of optical liquids, polymers and polymer compositions according to the present invention. For each sample medium, the sample identification number in Table 5 corresponds to a point in the Buchdahl dispersion plot shown in FIG. 8.

Looking now at some exemplary polymer compositions according to the present invention, all of the polymer compositions in FIG. 8 are abnormally dispersive to some extent. Looking at points 1, 2, and 4, the first two points represent polymer compositions of ethyl cinnamate while point 4 is ethyl cinnamate alone. Although compositions of 2% polyvinylcinnamate and 3% polyacenaphthalene in ethyl cinnamate both exhibit abnormal optical dispersion, they are slightly less abnormal than ethyl cinnamate alone. As discussed above, in general, upon adding a normally dispersive polymer to an abnormal optical liquid, the resulting polymer composition will be somewhat less abnormally dispersive than the optical liquid alone.

In further support of the invention, the following polymer compositions were also found to be abnormally dispersive (e.g., points 12, 13, and 14 in FIG. 8): 17% polystyrene in ethyl cinnamate, 17% polymethylmethacrylate in ethyl cinnamate, and 23% polymethylmethacrylate in ethyl cinnamate. Of this group, the composition containing 17% polymethylmethacrylate in ethyl cinnamate was the most abnormal, lying a distance of about 0.05 along the horizontal axis from the normal line for glasses.

V. Utility

From the foregoing, it will be appreciated how various objects and features of the invention are met. The polymer composition described is for use as a liquid-lens element in a compound lens designed to reduce chromatic aberration. The polymer composition provides a liquid lens element containing an abnormal optical liquid and is characterized by an abnormal optical dispersion.

Due to the enhanced viscosity of the polymer composition over that of the abnormal optical liquid, the resulting composition provides greater ease in handling, and is more easily manipulated for inclusion into a compound lens system. In general, problems associated with debonding or leakage of a liquid lens element (e.g., composed solely of an abnormal optical liquid) from the lens system are reduced when employing the polymer composition of the invention.

In some instances, incorporation into a polymer composition may increase the stability of an optical liquid or reduce the change in refractive index as a function of temperature. Liquid lens elements formed of such compositions will typically remain transparent in the visible region for a longer period of time (e.g., by not becoming cloudy due to decomposition of the optical liquid component) and will require less refocusing.

Another consideration with glass-liquid apochromats is the possibility of the liquid freezing in extremely severe environments. In a preferred embodiment, the polymer composition of the invention has a lower freezing point (e.g., by at least 5° C.) than the optical liquid alone, and thus can be used to lower operating temperatures without becoming opaque. Lenses for use under severe environmental conditions include telescopic objective lens systems for use in astronomical telescopes and camera lenses for use in extreme weather.

Additionally, the liquid lens element provided by the polymer composition of the present invention may be used in long focal length camera lenses, high aperture microscope objectives, and relay lenses.

In another aspect, the polymer composition of the present invention may be used as a thermal compensator in a composite lens system containing a liquid lens element where the liquid lens exhibits large fluctuations in focal length as a function of temperature (e.g., as characterized by a large dn/dT value, where "n" refers to refractive index). For use as a thermal compensator, the polymer composition contains an optical liquid component and a polymer component as has been previously described. In this aspect of the invention, the optical liquid component (as well as the resulting polymer composition) is typically characterized by a change in refractive index as a function of temperature which can compensate or correct for the fluctuations in focal length exhibited by the liquid lens element. For use as a thermal compensator, the optical liquid present in the composition may or may not have an abnormal optical dispersion.

Although the invention has been described with respect to particular embodiments, it will be apparent to those skilled in the art that various changes and modifications can be made without departing from the invention.

EXAMPLE 1

Table 1 shows the chemical name, trade name and corresponding structure reference number for exemplary optical liquids for use in the invention.

The melting point characteristics of various optical liquids and combinations of optical liquids having abnormal optical dispersion properties were examined. Each liquid sample was placed in a 10 ml vial and the temperature of the sample was then reduced to −40° C. by immersion into a cooling bath of acetonitrile and liquid nitrogen. Each sample was maintained at −40° C. for a period of at least 5 minutes, and the sample was then visually examined for evidence of crystal formation. The results are summarized in Table 2 below.

TABLE 1

EXEMPLARY OPTICAL LIQUIDS AND SOLIDS

| Chemical Name | Trade Name | Structure Reference | Liquid or Solid |
|---|---|---|---|
| trans-cinnamaldehyde | — | 5A | liquid |
| ethyl cinnamate | — | 5B | liquid |
| 4-(methylphenylamino) methylene(amino)-benzoic acid, ethyl ester | GIVSORB UV-1 | 5C | liquid |
| N,N-dimethylamino-(trans-cinnamaldehyde) | — | 5D | liquid |
| trans-1-(4-pyridinyl)-2-(2-thiophenyl)ethene | — | 5E | solid |
| N-methylpyrrolidone 1-methyl-2-pyrrolidone | — | 5F | liquid |
| 4-(ethylphenylamino) methylene-(amino)-benzoic acid, ethyl ester | GIVSORB UV-2 | 5G | solid |
| 5-methyl-2-(1-methylethyl)cyclohyxanyl-2-aminobenzoate | Neo Heliopan MA | 5H | liquid |
| para-methoxycinnamic acid, isoamyl ester | Neo Heliopan E1000 | 5I | liquid |
| 2-phenylbenzimidazole-5-sulfonic acid | Neo Heliopan Hydro | 5J | solid |
| (2-hydroxy-4-methoxyphenyl)phenyl-methanone | Uvinul 3040 | 5K | solid |
| (2,4-dihydroxyphenyl)-phenyl-methanone | Uvinul 3000 | 5L | solid |
| 2-cyano-3,3-diphenyl-2-propenoic acid ethyl ester | Uvinul 3035 | 5M | solid |
| 2-cyano-3,3-diphenyl-2-propenoic acid, 2-ethylhexyl ester | Neo Heliopan 303 | 5N | liquid |
| 3-(4-methylbenzylidene)-d-1-camphor | Neo Heliopan MBC | 5O | solid |
| 3-(2H-benzotriazol-2-yl)-5-(1,1-dimethylethyl)-4-hydroxy-benzenepropanoic acid, C7–9-branched esters | Tinuvin 384 | 5P | liquid |
| α-[3-[3-(2H-benzotriazol-2-yl)-5-(1,1-dimethylethyl)-4-hydroxyphenyl]-1-oxopropyl]-ω-[3-[3-(2H-benzo-triazol-2-yl)-5-(1,1-dimethylethyl)-4-hydroxyphenyl]-1-oxopropoxy]-poly(oxy-1,2-ethane diyl) | Tinuvin 1130 | 5Q | liquid |
| 2-(2H-benzotriazol-2-yl)-4,6-bis(1-methyl-1-phenylethyl)phenol | Tinuvin 900 | 5R | liquid |
| N-(2-ethoxy-phenyl)-N'-(2-ethylphenyl)-ethanediamide | Sanduvor VSU Powder | 5S | solid |
| N-(2-ethoxyphenyl)-N'-(4-isodecylphenyl)-ethane diamide | Sanduvor 3206 | 5T | liquid |
| 1,2-bis(3,5-di-tert-butyl-4-hydroxyhydrocinnamoyl)hydrazine | Irganox MD 1024 | 5U | solid |
| tetrakis[methylene(3,5-di-tert-butyl-4-hydroxyhydrocinnamate)] | Irganox 1010 | 5V | solid |

TABLE 1-continued

EXEMPLARY OPTICAL LIQUIDS AND SOLIDS

| Chemical Name | Trade Name | Structure Reference | Liquid or Solid |
|---|---|---|---|
| methane | | | |
| 2-(2'-hydroxy-3'-5'-di-tert-amylphenyl)benzotriazole | Tinuvin 328 | 5W | solid |

TABLE 2

FREEZING-POINT CHARACTERISTICS OF PURE OPTICAL LIQUIDS AND OPTICAL LIQUID COMPOSITIONS

| Composition | Crystals –40° C. |
|---|---|
| Ethyl cinnamate | + |
| 6.5% Polyvinylcinnamate in ethyl cinnamate | + |
| 9.3% Polyacenaphthalene in ethyl cinnamate | + |
| 4.0% DAC (DAC = N—N,dimethylaminocinnamaldehyde) in ethyl cinnamate | + |
| 54% triacetin, 4.8% polyvinylcinnamate in ethyl cinnamate | + |
| 41% triacetin, 5.1% polyacenaphthalene in ethyl cinnamate | – |
| GIVSORB UV-1 | – |
| 48.1% Tinuvin 384 in GIVSORB UV-1 | – |
| 49.8% Tinuvin 1130 in GIVSORB UV-1 | – |
| 50.0% Neo Heliopan MA in GIVSORB UV-1 N-methylpyrrolidone | – |
| 50% GIVSORB UV-2 in N-methylpyrrolidone | + |
| 58.3% GIVSORB UV-2 in N-methylpyrrolidone | + |
| 15.5% Tinuvin 328 in N-methylpyrrolidone | + |
| 15.9% Sanduvor VSU powder in N-methylpyrrolidone | + |
| 50% Neo Heliopan MBC in N-methylpyrrolidone | + |
| 50% Univul 3000 in N-methylpyrrolidone | – |
| 52.3% Univul 3035 in N-methylpyrrolidone | + |
| 50% UV3040 in N-methylpyrrolidone | – |
| 5% Ethyl cinnamate in GIVSORB UV-1 | – |
| Tinuvin 384 | + |
| Tinuvin 1130 | – |
| Sanduvor 3206 | – |
| Sanduvor 3212 | – |
| Neo Heliopan MA | – |
| Neo Heliopan E1000 | + |
| Neo Heliopan 303 | – |

EXAMPLE 2

The solubility of various polymer additives in each of a number of exemplary abnormal optical liquids was examined.

Each polymer was blended with a corresponding optical liquid in the proportions described in Table 3 below. In a typical procedure, the polymer and the optical liquid were initially mixed together, placed on a shaker for a period ranging from one day to several weeks to promote dissolution, and the resulting mixture was then visually inspected.

As an illustration of the method, polyvinylcinnamate (Aldrich Chemical Co., Milwaukee, Wis.) (0.0501 g, 2.1% by weight), was blended with ethyl cinnamate (Aldrich) (2.3069 g) and the resulting mixture, 2.1% polyvinylcinnamate by weight, was then visually inspected for signs of precipitated particles. Compositions were also visually examined for signs of phase separation. The results of solubility experiments for various exemplary polymer compositions are summarized in Tables 3 and 4.

TABLE 3

SOLUBILITY OF POLYMER/OPTICAL LIQUID ADDITIVES IN ETHYL CINNAMATE

| Additive | Weight % | Soluble? |
|---|---|---|
| Polyvinylcinnamate | 2.1 | + |
| Polyvinylcinnamate | 6.5 | + |
| Polyacenaphthalene | 3.4 | + |
| Polyacenaphthalene | 9.3 | + |
| Polymethylmethacrylate | 25.3 | + |
| Polystyrene | 40.4 | + |
| Polystyrene | 26.4 | + |
| Polystyrene | 23.6 | + |

TABLE 4

SOLUBILITY OF 2- AND 3-COMPONENT TRIACETIN SYSTEMS*

| Additive 1, wt % | Additive 2, wt % | Soluble? |
|---|---|---|
| Polyvinylcinnamate, 1.3% | – | – |
| Polyvinylcinnamate, 4.8% | Ethyl cinnamate, 41% | + |
| Polyacenaphthalene, 1.5% | – | – |
| Polyacenaphthalene, 5.1% | Ethyl cinnamate 54% | + |
| Poly(2,6-dimethyl-p-phenylene oxide) (PDPO), 3.1% | – | – |
| PDPO, 2.4% | Ethyl cinnamate, 73% | – |
| Polymethylmethacrylate, 23.3% | – | – |
| Polymethylmethacrylate, 26.3% | Ethyl cinnamate, 53% | + |

EXAMPLE 3

Polystyrene, obtained was blended with ethyl cinnamate (Aldrich, Milwaukee, Wis.), in the following proportions: 2.0% polystyrene, 4.8% polystyrene, 9.1% polystyrene, 17% polystyrene, and 23% polystyrene. The mixtures were agitated on a rotator for a period of up to 4 weeks.

Differential scanning calorimetry of each sample was performed using a Mettler Calorimeter and the DSC thermograms are shown in FIGS. 6A–6E. FIG. 6A shows the scan for the 2.0% polystyrene/ethyl cinnamate matrix, and a single endotherm is observed. FIGS. 6B–E show thermograms for mixtures containing 4.8% polystyrene/ethyl cinnamate, 9.1% polystyrene/ethyl cinnamate, 17% polystyrene/ethyl cinnamate, and 23% polystyrene/ethyl cinnamate, respectively.

EXAMPLE 4

The optical dispersion properties of various optical liquids, combinations of optical liquids, and polymer compositions of optical liquids were determined. Refractive index measurements were performed on an Abbe refractometer. The temperature of the samples was maintained at either 20° C. or 25° C.

The measured refractive index data was converted to corresponding values of $\eta_1$ and $\eta_2$ using the Buchdahl dispersion model, as has been described elsewhere (Sigler, 1986), to provide a dispersion representation of the data. The results are summarized in Tables 5 and 6 and in FIG. 8. Values for $\Delta\eta_2$ are summarized in Table 6. Dispersion data for optical liquids designated by the letters "A"–"D" in FIG. 8 was provided by Cargille.

TABLE 5

SAMPLE ID FOR BUCHDAHL DISPERSION MAP

| Sample # | Sample Composition | Eta1 | Eta2 |
|---|---|---|---|
| 1 | 2% polyvinylcinnamate in Ethyl cinnamate | −0.269384 | 0.224975 |
| 2 | 3% polyacenaphthalene in Ethyl cinnamate | −0.269969 | 0.23069 |
| 3 | aniline | −0.223970 | 0.249559 |
| 4a | ethyl cinnamate 20° C. | −0.271102 | 0.240127 |
| 4b |  | −0.268978 | 0.230988 |
| 5 | ethyl cinnamate 25° C. | −0.269290 | 0.194388 |
| 6 | polyvinylcinnamate & gamma-butyrolactone | −0.105212 | −0.0270832 |
| 7 | GIVSORB UV1 | −0.387778 | 0.541059 |
| 8 | 3.2% trans-1-4-pyridyl-2-thiophenylethene in GIVSORB UV1 | −0.394250 | 0.562490 |
| 9 | 4% ethyl cinnamate in GIVSORB UV1 | −0.382039 | 0.528459 |
| 10 | N,N-dibutylaniline | −0.185377 | 0.190385 |
| 11 | t-cinnamaldehyde | −0.363607 | 0.398914 |
| 12 | 17% polystyrene in ethyl cinnamate | −0.255009 | 0.186960 |
| 13 | 17% polymethylmethacrylate in ethyl cinnamate | −0.246152 | 0.209143 |
| 14 | 23% polymethylmethacrylate in ethyl cinnamate | −0.241233 | 0.166921 |
| 15 | Tinuvin 1130 at 20° C. | −0.245497 | 0.379239 |
| 16 | Tinuvin 384 at 20° C. | −0.281888 | 0.417171 |
| 17 | 9.8% Tinuvin 328 in Tinuvin 384 | −0.294300 | 0.382109 |
| 18 | 18.9% Irganox 1010 in ethyl cinnamate | −0.247955 | 0.221158 |
| 19 | 50% Tinuvan 1130 in GIVSORB UV1 | −0.328335 | 0.477714 |
| 20 | 48% Tinuvin 384 in GIVSORB UV1 | −0.338441 | 0.466302 |
| 21 | Tinuvan 384 at 25° C. | −0.281012 | 0.390811 |
| 22 | Tinuvin 1130 at 25° C. | −0.238833 | 0.361669 |
| 23 | 11.4% Tinuvin 900 in ethyl cinnamate | −0.278052 | 0.232129 |
| 24 | N-methylpyrrolidone | −0.118658 | 0.0360008 |
| 25 | 19.5% trans-1-4-pyridyl-2-thiophenylethene in N-methylpyrrolidone | −0.202878 | 0.225535 |
| 26 | 50% GIVSORB UV2 in N-methylpyrrolidone | −0.274186 | 0.354887 |
| 27 | Sanduvor 3206 | −0.217004 | 0.142227 |
| 28 | Sanduvor 3212 | −0.186993 | 0.132211 |
| 29 | 23.6% polystyrene in ethyl cinnamate | −0.247665 | 0.190590 |
| 30 | 10% GIVSORB UV2 in GIVSORB UV1 | −0.383710 | 0.522536 |
| 31 | 15.9% Sanduvor VSU powder in N-methylpyrrolidone | −0.146962 | 0.0289927 |
| 32 | 52.3% UVINUL 3035 in N-methylpyrrolidone | −0.212485 | 0.203608 |
| 33 | Neo Heliopan MA | −0.203501 | 0.220406 |
| 34 | 50% Neo Heliopan MBC in N-methylpyrrolidone | −0.195326 | 0.215685 |
| 35 | Neo Heliopan E1000 | −0.298694 | 0.314849 |
| A | aliphatic hydrocarbon and 1-bromonaphthalene | −0.246573 | 0.152258 |
| B | 1-bromoanaphthalene and 1-iodonaphthalene | −0.275037 | 0.173171 |
| C | index standard 1.628 | −0.215349 | 0.086149 |
| D | index standard 1.632 | −0.221403 | 0.0837911 |
| E | Poly(styrene) | −0.162920 | 0.048770 |
| F | Poly(methyl methacrylate) | −0.089080 | 0.005710 |

TABLE 6

$\Delta_{\eta 2}$ VALUES CORRESPONDING TO BUCHDAHL DISPERSION MAP

| Sample # | Sample Composition | $\Delta_{\eta 2}$ |
|---|---|---|
| 1 | 2% polyvinylcinnamate in Ethyl cinnamate | 0.145159 |
| 2 | 3% polyacenapthalene in Ethyl cinnamate | 0.107885 |
| 3 | Aniline | 0.159124 |
| 4a | ethyl cinnamate 20° C. | 0.116506 |
| 4b |  |  |
| 5 | ethyl cinnamate 25° C. | 0.072061 |
| 6 | polyvinylcinnamate & gamma-butyrolactone | 0.033947 |
| 7 | GIVSORB UV1 | 0.335351 |
| 8 | 3.2% cis-1-4-pyridyl-2-thiophenylethene in GIVSORB UV1 | 0.352227 |
| 9 | 4% ethyl cinnamate in GIVSORB UV1 | 0.326789 |
| 10 | N,N-dibutylaniline | 0.127108 |
| 11 | t-cinnamaldehyde | 0.210215 |
| 12 | 17% polystyrene in ethyl cinnamate | 0.074683 |
| 13 | 17% polymethylmethacrylate in ethyl cinnamate | 0.103098 |
| 14 | 23% polymethylmethacrylate in ethyl cinnamate | 0.064338 |
| 15 | Tinuvin 1130 at 20° C. | 0.273655 |
| 16 | Tinuvin 384 at 20° C. | 0.285979 |
| 17 | 9.8% Tinuvin 328 in Tinuvin 384 | 0.242182 |
| 18 | 18.9% Irganox 1010 in ethyl cinnamate | 0.113845 |
| 19 | 50% Tinuvan 1130 in GIVSORB UV1 | 0.313836 |
| 20 | 48% Tinuvin 384 in GIVSORB UV1 | 0.295313 |
| 21 | Tinuvan 384 at 25° C. | 0.260235 |
| 22 | Tinuvan 1130 at 25° C. | 0.260775 |
| 23 | Tinuvin 900 in ethyl cinnamate | 0.103636 |
| 24 | N-methylpyrrolidone | 0.019675 |
| 25 | 19.5% cis-1-4-pyridyl-2-thiophenylethene in N-methylpyrrolidone | 0.208122 |
| 26 | 50% GIVSORB UV2 in N-methylpyrrolidone | 0.229115 |
| 27 | Sanduvor 3206 | 0.056694 |
| 28 | Sanduvor 3212 | 0.067797 |
| 29 | 23.6% polystyrene in ethyl cinnamate | 0.083481 |
| 30 | 10% GIVSORB UV2 in ethyl cinnamate 31 | 0.319690 |
| 31 | 15.9% Sanduvor VSU powder in N-methylpyrrolidone | 0.007251 |
| 32 | 52.3% UVINUL 3035 in N-methylpyrrolidone | 0.121255 |
| 33 | Neo Heliopan MA | 0.144375 |
| 34 | 50% Neo Heliopan MBC in N-methylpyrrolidone | 0.145407 |
| 35 | Neo Heliopan E1000 | 0.171830 |
| A | aliphatic hydrocarbon and 1-bromonaphthalene | 0.045917 |
| B | 1-bromoanaphthalene and 1-iodonaphthalene | 0.046800 |
| C | index standard 1.628 | 0.001781 |
| D | index standard 1.632 | 0.004837 |
| E | poly(styrene) | 0.0012966 |
| F | poly(methyl methacrylate) | 0.0101986 |

It is claimed:
1. A polymer composition for use as a liquid-lens element in a compound lens designed to reduce chromatic aberration, comprising:
an abnormal optical liquid in monomeric form characterized by an abnormal optical dispersion value, defined by the difference between the value of $\eta_2$ measured for the abnormal optical liquid and the value of $\eta_2$ determined from a normal Buchdahl dispersion line for glasses at a given $\eta_1$, of at least ±0.01 dispersion units, and dispersed in the liquid, a polymer that is (i) soluble in the liquid, and (ii) present in an amount effective to impart a viscosity that is at least ten-fold greater than that of the liquid alone at a selected temperature, without reducing the optical dispersion value below ±0.01 dispersion units from the normal Buchdahl dispersion line for glasses for the $\eta_2$ value of the composition.

2. The composition of claim 1, wherein the optical liquid is a cinnamic acid derivative selected from the group consisting of ethyl cinnamate, amyl-trans-cinnamaldehyde, trans-cinnamaldehyde, methyl-trans-cinnamaldehyde, and N,N-dimethylamino(trans-cinnamaldehye).

3. The composition of claim 1, wherein the optical liquid is ethyl cinnamate.

4. The composition of claim 1, wherein the optical liquid is N-methylpyrrolidone.

5. The composition of claim 1, wherein the optical liquid is selected from the group consisting of 4-(methylphenylamino)methylene(amino)-benzoic acid, ethyl ester; 3-(2H-benzotriazol-2-yl)-5-(1,1-dimethylethyl)-4-hydroxy-benzenepropanoic acid, C7-9-branched esters; 2-(2'-hydroxy-3'-5'-di-tert-amylphenyl)benzotriazole; para-methoxycinnamic acid, isoamyl ester; 5-methyl-2-(1-methylethyl)cyclohexanyl-2-aminobenzoate; and 2-cyano-3,3-diphenyl-2-propenoic acid, 2-ethylhexyl ester.

6. The composition of claim 1, where the abnormal optical liquid is composed of one or more abnormal optical solids selected from the group consisting of 4-(ethyl phenylamino)methylene-amino-benzoic acid, ethyl ester; trans-1-(4-pyridinyl)-2-(2-thiophenyl)ethene; (2-hydroxy-4-methoxyphenyl)phenyl-methanone; (2,4-dihydroxyphenyl)-phenyl-methanone; 2-(2'-hydroxy-3',5'-di-tert-amylphenyl) benzotriazole; and 3-(4-methylbenzylidene)-d-1-camphor, dissolved in an organic solvent.

7. The composition of claim 1, wherein the polymer is present in the composition in an amount between 2–40 weight percent.

8. The composition of claim 1, wherein the polymer has a molecular weight between 10–1000 kDaltons.

9. The composition of claim 1, wherein the polymer is selected from the group consisting of polystyrene, polydimethylsiloxane, polymethylmethacrylate, polyvinyl alcohol, polyacenaphthalene, and polyvinylcinnamate.

10. The composition of claim 1, wherein the polymer is polystyrene.

11. The composition of claim 1, wherein the polymer includes covalently attached molecules of the optical liquid.

12. The composition of claim 1, wherein the polymer is present in an amount effective to depress the freezing point of the composition at least about 5° C. below that of the optical liquid alone.

13. The composition of claim 1, wherein the polymer is further characterized by having a normal optical dispersion.

14. The composition of claim 1, wherein said composition contains more than one abnormal optical liquid.

15. A compound lens characterized by low chromatic aberration, comprising:
 a rigid converging lens;
 a rigid diverging lens; and
 carried in a sealed space between the two lenses, a polymer composition composed of:
 an abnormal optical liquid in monomeric form characterized by an abnormal optical dispersion value, defined by the difference between the value of $\eta_2$ measured for the abnormal optical liquid and the value of $\eta_2$ determined from a normal Buchdahl dispersion line for glasses at a given $\eta_1$, of at least ±0.01 dispersion units, and
 dispersed in the liquid, a polymer that is (i) soluble in the liquid, and (ii) present in an amount effective to impart a viscosity that is at least ten-fold greater than that of the liquid alone at a selected temperature, without reducing the optical dispersion value below ±0.01 dispersion units from the normal Buchdahl dispersion line for glasses for the $\eta_2$ value of the composition.

16. The compound lens of claim 15, wherein the optical liquid is a cinnamic acid derivative selected from the group consisting of ethyl cinnamate, amyl-trans-cinnamaldehyde, trans-cinnamaldehyde, methyl-trans-cinnamaldehyde, and N,N-dimethylamino(trans-cinnamaldehyde).

17. The compound lens of claim 15, wherein the optical liquid is ethyl cinnamate.

18. The compound lens of claim 15, wherein the optical liquid is N-methylpyrrolidone.

19. The compound lens of claim 15, wherein the optical liquid is selected from the group consisting of 4-(methylphenylamino)methylene(amino)-benzoic acid, ethyl ester; 3-(2H-benzotriazol-2-yl)-5-(1,1-dimethylethyl)-4-hydroxy-benzenepropanoic acid, C7-9-branched esters; 2-(2'-hydroxy-3'-5'-di-tert-amylphenyl)benzotriazole; para-methoxycinnamic acid, isoamyl ester; 5-methyl-2-(1-methylethyl)cyclohexanyl-2-aminobenzoate; and 2-cyano-3,3-diphenyl-2-propenoic acid, 2-ethylhexyl ester.

20. The compound lens of claim 15, where the abnormal optical liquid is composed of one or more abnormal optical solids selected from the group consisting of 4-(ethyl phenylamino)methylene-amino-benzoic acid, ethyl ester; trans-1-(4-pyridinyl)-2-(2-thiophenyl)ethene; (2-hydroxy-4-methoxyphenyl)phenyl-methanone; (2,4-dihydroxyphenyl)-phenyl-methanone; 2-(2'-hydroxy-3',5'-di-tert-amylphenyl) benzotriazole; and 3-(4-methylbenzylidene)-d-1-camphor, dissolved in an organic solvent.

21. The compound lens of claim 15, wherein the polymer is present in the composition in an amount between 2–40 weight percent.

22. The compound lens of claim 15, wherein the polymer has a molecular weight between 10–1000 kDaltons.

23. The compound lens of claim 15, wherein the polymer is selected from the group consisting of polystyrene, polydimethylsiloxane, polymethylmethacrylate, polyvinyl alcohol, polyacenaphthalene, and polyvinylcinnamate.

24. The compound lens of claim 15, wherein the polymer is present in an amount effective to depress the freezing point of the composition at least about 5° C. below that of the optical liquid alone.

25. The compound lens of claim 15, wherein said composition contains more than one abnormal optical liquid.

* * * * *